(12) United States Patent
Harris et al.

(10) Patent No.: US 11,787,085 B2
(45) Date of Patent: Oct. 17, 2023

(54) METHODS OF MAKING AND USING BULK PRODUCTS INCLUDING FIBER-CONTAINING PARTICLES WITH DUAL-TAPERED SHAPE

(71) Applicant: VARTEGA INC., Denver, CO (US)

(72) Inventors: Jordan Gray Harris, Arvada, CO (US); Kylie Marie Van Aken, Edgewater, CO (US); Sean Paul Kline, Littleton, CO (US); Andrew Timothy Maxey, Arvada, CO (US); Sean Louis Hankins, Jacksonville, FL (US)

(73) Assignee: Vartega Inc., Denver, CO (US)

( * ) Notice: Subject to any disclaimer, the term of this patent is extended or adjusted under 35 U.S.C. 154(b) by 0 days.

(21) Appl. No.: 17/674,089

(22) Filed: Feb. 17, 2022

(65) Prior Publication Data
US 2023/0139377 A1 May 4, 2023

Related U.S. Application Data

(63) Continuation of application No. PCT/US2021/057389, filed on Oct. 29, 2021.

(51) Int. Cl.
*B29B 9/14* (2006.01)
*B29B 9/06* (2006.01)
(Continued)

(52) U.S. Cl.
CPC .................. *B29B 9/14* (2013.01); *B29B 9/06* (2013.01); *B29C 45/0001* (2013.01);
(Continued)

(58) Field of Classification Search
CPC . B29B 17/0026; B29B 17/0036; B29B 17/04; B29B 17/0412; B29B 17/042; B29B 9/14
See application file for complete search history.

(56) References Cited

U.S. PATENT DOCUMENTS 2,936,487 A * 5/1960 Paz ........................... B29B 9/14
425/332
3,635,752 A * 1/1972 Baer ....................... B29C 70/14
524/847

(Continued)

OTHER PUBLICATIONS

"ReCF™—CP Recycled Carbon Fiber Chopped Strands", Nantong Fuyuan New Material Technology Co., Ltd., Web page, <http://rcffy.com/product/info.aspx?itemid=12>, 3 pages, Oct. 25, 2020, retrieved Jul. 2022 from Internet Archive Wayback Machine, <https://web.archive.org/web/20201025213821/http://www.rcffy.com/product/info.aspx?itemid=12>, publication date unknown.

(Continued)

*Primary Examiner* — Jeffrey M Wollschlager
(74) *Attorney, Agent, or Firm* — Snell & Wilmer L.L.P.; Ross E. Breyfogle

(57) ABSTRACT

Recycled carbon fibers are processed by rotational tumbling in a mixture with binder material to prepare fiber-containing particles having a dual-tapered shape and general alignment of fibers with a longitudinal direction of the particles. Bulk products including such fiber-containing particles are compounded with polymer and pelletized to prepare fiber-reinforced composite pellets, which are useful for applications such as injection molding to prepare molded products of carbon fiber-reinforced composite material with recycled carbon fibers.

41 Claims, 9 Drawing Sheets

US 11,787,085 B2

Page 2

(51) Int. Cl.
  *B29C 45/00* (2006.01)
  *C08J 3/12* (2006.01)
(52) U.S. Cl.
  CPC ............. *B29C 45/0005* (2013.01); *C08J 3/12* (2013.01); *B29C 2045/001* (2013.01)

(56) References Cited

U.S. PATENT DOCUMENTS

| | | | |
|---|---|---|---|
| 5,578,535 A * | 11/1996 | Hill | C03C 25/00 106/600 |
| 5,868,982 A * | 2/1999 | Strait | C03C 1/026 264/117 |
| 6,365,090 B1 * | 4/2002 | Strait | C03C 25/26 264/494 |
| 6,365,272 B1 * | 4/2002 | Masson | C03C 25/26 428/394 |
| 7,267,782 B2 * | 9/2007 | Piret | C03C 25/326 65/447 |
| 7,582,239 B2 | 9/2009 | Thomason | |
| 9,416,253 B2 | 8/2016 | Gehr | |
| 10,487,191 B2 | 11/2019 | Maxey | |
| 10,610,911 B1 * | 4/2020 | Maxey | C01B 32/17 |
| 10,829,611 B1 | 11/2020 | Maxey et al. | |
| 11,135,743 B1 | 10/2021 | Maxey et al. | |
| 2005/0214524 A1 * | 9/2005 | Blanchard | C03C 25/26 428/325 |
| 2006/0006571 A1 | 1/2006 | Kindle et al. | |
| 2010/0178495 A1 | 7/2010 | Taketa et al. | |
| 2011/0111172 A1 | 5/2011 | Gideon et al. | |
| 2012/0183861 A1 | 7/2012 | Gupta et al. | |
| 2015/0025191 A1 | 1/2015 | Naito et al. | |
| 2019/0054707 A1 | 2/2019 | Miyoshi et al. | |
| 2019/0112446 A1 | 4/2019 | Maxey | |
| 2021/0031409 A1 | 2/2021 | Patlolla | |

OTHER PUBLICATIONS

"ReCF™—CP Recycled Carbon Fiber Chopped Strands", Nantong Fuyuan New Material Technology Co., Ltd., Web page, <http://rcffy.com/product/info.aspx?itemid=12>, 3 pages, retrieved Jul. 2022, accessed Apr. 2022, publicaton date unknown.
"CCE-JEC Innovation Awards 2021", JEC Group, Web page, <https://jeccomposites.com/news/cce-jec-innovation-awards-2021/>, 15 pages, dated Mar. 28, 2022, retrieved Jul. 2022, accessed Apr. 2022, publication date unknown.
"FUY® Chopped carbon fibers Prodcuts", Nantong Fuyuan Carbon Fiber Recycling Co., Ltd, 2 pages, document dated Aug. 8, 2021, downloaded from <http://rcffy.com/product/info.aspx?itemid=12>, accessed Apr. 2022, publication date unknown.
"Product Center", Nantong Fuyuan New Material Technology Co., Ltd., Web page, <http://www.rcffy.com/product/list.aspx>, 2 pages, retrieved Jul. 2022, accessed Apr. 2022, publicaton date unknown.
"Product Center", Nantong Fuyuan New Material Technology Co., Ltd., Web page, <http://www.rcffy.com/product/list.aspx>, 2 pages, Jan. 16, 2021, retreived Jul. 2022 from Internet Archive Wayback Machine, <https://web.archive.org/web/20210116084702/http://www.rcffy.com/product/list.aspx>, publication date unknown.
"Product Center", Nantong Fuyuan New Material Technology Co., Ltd., Web page, <http://www.rcffy.com/product/list.aspx>, 2 pages, Mar. 31, 2022, retreived Jul. 2022 from Internet Archive Wayback Machine, <https://web.archive.org/web/20220331114321/http://www.rcffy.com/product/list.aspx>, publication date unknown.
"Carbon Conversions Carbon Fiber Products", Carbon Conversions, Web page, <http://carbonconversions.com/products>, 6 pages, accessed amd retrieved Jul. 2022, publicaton date unknown.
"Carbon Conversions Carbon Fiber Products", Carbon Conversions, Web page, <http://carbonconversions.com/products>, 6 pages, Jul. 31, 2021, retreived Jul. 2022 from Internet Archive Wayback Machine, <https://web.archive.org/web/20210731223607/http://carbonconversions.com/products>, publication date unknown.

"100% Carbon Fibers", Mitsubishi Chemical Advanced Materials GmbH, Web page, <http://carbonxt.de/en/products>, 2 pages, accessed and retrieved Jul. 2022, publicaton date unknown.
"CarboNXT Chopped", Mitsubishi Chemical Advanced Materials GmbH, Web page, <http://carbonxt.de/en/products/chopped>, 1 page, accessd and retrieved Jul. 2022, publicaton date unknown.
"CarboNXT Chopped", Mitsubishi Chemical Advanced Materials GmbH, Web page, <http://carbonxt.de/en/products/chopped>, 2 pages, Jun. 20, 2021, retreived Jul. 2022 from Internet Archive Wayback Machine, <https://web.archive.org/web/20210620162227/http://carbonxt.de/en/products/chopped>, publication date unknown.
"CarboNXT Fiberball", Mitsubishi Chemical Advanced Materials GmbH, Web page, <http://carbonxt.de/en/products/fiberball>, 1 page, accessed and retrieved Jul. 2022, publicaton date unknown.
"CarboNXT Fiberball", Mitsubishi Chemical Advanced Materials GmbH, Web page, <http://carbonxt.de/en/products/fiberball>, 2 page, Jun. 20, 2021, retreived Jul. 2022 from Internet Archive Wayback Machine, <https://web.archive.org/web/20210620152554/http://carbonxt.de/en/products/fiberball>, publication date unknown.
"CarboNXT Fibertube", Mitsubishi Chemical Advanced Materials GmbH, Web page, <http://carbonxt.de/en/products/fibertube>, 1 page, accessed and retrieved Jul. 2022, publicaton date unknown.
"CarboNXT Fibertube", Mitsubishi Chemical Advanced Materials GmbH, Web page, <http://carbonxt.de/en/products/fibertube>, 1 page, Jun. 20, 2021, retreived Jul. 2022 from Internet Archive Wayback Machine, <https://web.archive.org/web/20210620164207/http://carbonxt.de/en/products/fibertube>, publication date unknown.
"CarboNXT rCF Compound", Mitsubishi Chemical Advanced Materials GmbH, Web page, <http://carbonxt.de/en/products/rcf-compond>, 1 page, accessed and retrieved Jul. 2022, publicaton date unknown.
"CarboNXT rCF Compound", Mitsubishi Chemical Advanced Materials GmbH, Web page, <http://carbonxt.de/en/products/rcf-compond>, 1 page, Jun. 20, 2021, retreived Jul. 2022 from Internet Archive Wayback Machine, <https://web.archive.org/web/20210620164722/http://carbonxt.de/en/products/rcf-compound>, publication date unknown.
"CarboNXT rCF smc/rCF bmc", Mitsubishi Chemical Advanced Materials GmbH, Web page, <http://carbonxt.de/en/products/rcf-smc-rcf-bmc>, 2 pages, accessed and retrieved Jul. 2022, publicaton date unknown.
"CarboNXT rCF smc/rCF bmc", Mitsubishi Chemical Advanced Materials GmbH, Web page, <http://carbonxt.de/en/products/rcf-smc-rcf-bmc>, 2 pages, Jun. 20, 2021, retreived Jul. 2022 from Internet Archive Wayback Machine, <https://web.archive.org/web/20210620152934/http://carbonxt.de/en/products/rcf-smc-rcf-bmc>, publication date unknown.
"Technical Fibers: Recycled Carbon", Procotex, Web page, <https://en.procotex.com/products/technical-fibres/recycled-carbon-fibres-carbiso>, 10 pages, accessed and retrieved Jul. 2022, publicaton date unknown.
"Carbon Fiber Products", Shocker Composites, LLC, Web page, <https://www.shockercomposites.com/products>, 5 pages, accessed and retrieved Jul. 2022, publicaton date unknown.
"Products", Carbon Fiber Recycling, Web page, <http://carbonfiberrecycling.com/products.html>, 3 pages, accessed and retrieved Jul. 2022, publicaton date unknown.
"Products", Carbon Fiber Recycling, Web page, <http://carbonfiberrecycling.com/products.html>, 3 pages, Jul. 19, 2020, retreived Jul. 2022 from Internet Archive Wayback Machine, <https://web.archive.org/web/20200719031944/http://carbonfiberrecycling.com/products.html>, publication date unknown.
"Sale of Recycled Carbon Fiber", Carbon Fiber Recycling Industry co.ltd., Web page, <https://cfri.co.jp/businesses/sale-cf>, 2 pages, accessed and retreived Jul. 2022, publication date unknown.
"Sale of Recycled Carbon Fiber", Carbon Fiber Recycling Industry co.ltd., Web page, <https://cfri.co.jp/businesses/sale-cf>, 2 pages, Jul. 23, 2021, retreived Jul. 2022 from Internet Archive Wayback Machine, <https://web.archive.org/web/20210723220245/https://cfri.co.jp/businesses/sale-cf>, publication date unknown.
"Karborek: Recycling Carbon Fibers", Karborek RCF, Web page, <http://www.karborekrcf.it/index_eng.html>, 6 pages, accessed and retrieved Jul. 2022, publicaton date unknown.

(56) References Cited

OTHER PUBLICATIONS

"Karborek: Recycling Carbon Fibers", Karborek RCF, Web page, <http://www.karborekrcf.it/index_eng.html>, 7 pages, Jan. 19, 2021, retreived Jul. 2022 from Internet Archive Wayback Machine, <https://web.archive.org/web/20210119125425/http://www.karborekrcf.it/index_eng.html>, publication date unknown.

* cited by examiner ated polymer in the extrusion barrel. The extrudate includ-
METHODS OF MAKING AND USING BULK PRODUCTS INCLUDING FIBER-CONTAINING PARTICLES WITH DUAL-TAPERED SHAPE

REFERENCE TO RELATED APPLICATIONS

This application is a continuation of international patent application no. PCT/US2021/057389 entitled "FIBER-CONTAINING PARTICLES WITH DUAL-TAPERED SHAPE" filed Oct. 29, 2021, the entire contents of which are incorporated by reference herein for all purposes.

STATEMENT ON FEDERALLY SPONSORED RESEARCH OR DEVELOPMENT

This invention was made with Government support under DE-EE0006926 awarded by the U.S. Department of Energy. The Government has certain rights in this invention.

FIELD

The invention relates to packaging fibers, and especially recycled carbon fibers, into fiber-containing particles, including methods of preparing the particles, bulk products including the particles and methods of use to prepare fiber-reinforced composites.

BACKGROUND

Carbon and other fibers are used in a variety of reinforcing applications in which the fibers are combined with a matrix, often a polymeric matrix, to provide reinforcement to the matrix material and to provide enhanced material properties. A composite material of fiber-reinforced polymer is sometimes referred to generally by the acronym FRP and a composite material of carbon fiber-reinforced polymer is sometimes referred to by the acronym CFRP. The commercial value of reinforcing fibers and environmental and landfill considerations have created significant interest in development of processes to recover and recycle reinforcing fibers for reuse. This is especially the case for carbon fibers, as virgin carbon fibers have a high cost. A significant amount of CFRP that is produced is never used and ends up as waste. For example, it is common in CFRP applications for material trim and scrap waste to amount to about 30% or more of finished part weight. Additionally, the amount of CFRP products has been growing rapidly for several years and there is expected to be a rapidly growing need to address end-of-life issues for CFRP products.

CFRP composites as possible feed to recycling operations come in a variety of forms and compositions. Some CFRP composites available as feed to recycling are in the form of prepreg including a matrix of thermoset polymer resin, while other composites available as feed to recycling are in the form of cured products in which a thermoset polymer resin has been cured to form a cross-linked matrix. Yet other CFRP composites available for feed to recycling include a matrix of thermoplastic polymer, and emerging CFRP composites are being developed with engineered polymers that do not neatly categorize as either thermoplastic or thermoset.

Various different processes have been developed and continue to be developed to free carbon fibers from the matrix in CFRP products to permit recovery of the freed fibers for recycling. Some processing techniques to free carbon fibers from matrix, sometimes referred to as pyrolysis, subject the CFRP to high temperatures, typically in an oxygen-free or oxygen-limited environment, to decompose the matrix to gaseous and/or liquid decomposition products without destroying the carbon fibers. Other processing techniques, sometimes referred to as depolymerization techniques, use chemical agents to react with and break down material of the matrix into decomposition products, from which the fibers may be separated. Other processing techniques, sometimes referred to as solvolysis techniques, use a solvent to dissolve away material of the matrix to free the fibers for recovery. Some processes may use a combination of these techniques.

Whereas virgin carbon fiber is typically prepared in the form of continuous fiber strands, the bulk of recycled carbon fibers is currently, and is expected to continue to be available, primarily in a form of non-continuous, relatively short fibers and with significant randomness in fiber orientation and intertwining of individual fibers. One common technique to prepare virgin carbon fibers for incorporation into CFRP composites is to prepare a bound bundle of parallel continuous fiber strands, such as in the form of a fiber tow, and to cut the bound continuous bundle into pellets of a desired length. The fibers may be held in the bundle by fiber sizing previously applied to the bundle (e.g., sized tow). Pellets prepared by chopping fiber tow bundles may be referred to as chopped tow pellets. Such pellets may be prepared with a size and shape for convenient feed to a compounding extruder, for example from a hopper into a side feeder to a twin screw extruder. A common side feeder has a feed screw that positively pushes the pellets into polymer melt in the extrusion barrel. The extrudate including the polymer and carbon fibers may then be cooled and cut into pellets of CFRP material. These pellets may be used for various applications, such as injection molding, to prepare various product forms made of CFRP composite. The ability to process the virgin carbon fibers in the form of a bundle of continuous fiber strands permits tight process control to prepare pellets of uniform size and composition and with good properties of flowability during bulk handling and good dispersibility of fibers in polymer melt during compounding. These techniques for processing virgin carbon fibers are generally not applicable, however, to processing of the great majority of recycled carbon fibers, which after recovery during recycling operations tend to be in a non-continuous form and with significant randomness in orientation of the carbon fibers and intertwining of fibers, and there is a significant need for alternative techniques that will permit wider use of recycled carbon fibers to prepare CFRP composites.

SUMMARY

As noted, recycled carbon fibers are typically recovered as relatively short, non-continuous fiber lengths, with a high degree of randomness in fiber orientation and with significant fiber intertwining, and tend to form cotton ball-like clumps that are not amenable to effective handling and processing with conventional equipment and techniques designed for use with flowable powders and other bulk materials. Recycled carbon fibers have a high tendency, for example, to stick together in clumps and form bridges that block flow from hoppers into feeders to compounding extruders.

Attempts to employ traditional pellet milling to prepare masterbatch pellets with recycled carbon fibers mixed with polymer were of limited success. Recycled carbon fibers resulted in only marginally functional masterbatch pellets which could only be successfully compounded with polymer when the recycled fibers were milled down to a size of approximately 150 microns. As may be appreciated, longer fibers, with a higher aspect ratio, are desirable for enhanced performance as a polymer reinforcement. However, masterbatch pellets made with longer recycled fibers were found to provide poor mechanical performance for polymer compounding. The pellets were found to be too dense to permit effective disintegration and dispersion of the carbon fibers during extrusion processing to form a CFRP composite, which resulted in inconsistent fiber loading in injection molded test forms.

The methods and products disclosed herein are intended to at least partially address in a significant way problems associated with incorporating recycled carbon fibers into CFRP composites and making molded products from such CFRP composites. Although the methods and products disclosed herein are described primarily with reference to carbon fibers, the disclosure applies also to other fibers, including other recycled fibers. Also, the methods and products disclosed herein are also applicable to processing virgin fibers that are processed in the form of relatively short fibers rather than in a continuous form. Such virgin fibers in non-continuous form may be a direct result of a manufacturing process and/or may be fibers cut from continuous fiber strands. The methods and products disclosed herein are particularly advantageous for use with recycled fibers, such as recycled carbon fibers, that are typically recovered in a non-continuous fiber form and with a high degree of randomness of fiber orientation and fiber intertwining, which makes subsequent processing of the recycled fibers difficult to prepare fiber-reinforced polymers using the recycled fibers.

A first aspect of this disclosure is directed to fiber-containing particles including reinforcing fibers bound in a particle structure having an elongated, dual-tapered shape. Such a fiber-containing particle may comprise:

a major portion by weight, and preferably from 90 weight percent to 99.5 weight percent, of reinforcing fibers;

a minor portion by weight, and preferably from 0.5 weight percent to 10 weight percent, of binder holding the reinforcing fibers in the particle structure;

a particle length dimension, preferably in a range of from 3 millimeters to 40 millimeters, being a maximum separation distance in a longitudinal direction between first and second longitudinal ends of the fiber-containing particle;

a maximum particle width dimension transverse to the longitudinal direction at a longitudinal location between the first and second longitudinal ends;

an aspect ratio equal to the particle length dimension divided by the maximum particle width dimension that is larger than 1, and preferably is at least 1.5; and a dual-tapered shape comprising a first tapered portion tapering in the longitudinal direction away from the longitudinal location toward the first longitudinal end and a second tapered portion tapering in the longitudinal direction away from the longitudinal location toward the second longitudinal end.

Such fiber-containing particles prepared with recycled carbon fibers have been found to promote flowability of bulk products with the fiber-containing particles for feeding to compounding extruders through extrusion feeders supplied from conventional hoppers, for example from vibratory loss-in-weight hoppers, to prepare carbon fiber-reinforced polymer composites including carbon reinforcing fibers provided by the fiber-containing particles dispersed in a polymeric matrix. The fiber-containing particles provide an advantageous combination of reasonable flowability for bulk product handling and maintenance of sufficient particle integrity during normal handling and processing operations up to and through a feed hopper during compounding operations, and then degrading from the particle structure due to shear exerted in side screw feeders to an extruder barrel and in polymer melt during extrusion processing to provide an extrudate with reinforcing fibers reasonably well dispersed in the extruded polymer. The dual-taper particle structure permits convenient incorporation of fibers of varying lengths into the fiber-containing particles for beneficial use of a range of fiber lengths in fiber reinforcing applications. Moreover, the dual-taper shape is characteristic of a significant degree of longitudinal alignment of fibers with the longitudinal direction of the fiber-containing particles, which is believed to significantly contribute to the development of enhanced flowability in bulk product form and enhanced dispersibility of the fibers from the particles into polymer melt during polymer compounding to prepare fiber-reinforced polymer composites. Achievement of such a significant degree of fiber alignment significantly reduces the randomness of fiber orientation, which has a significant benefit of reducing protrusions of fibers from the fiber-containing particles perpendicular to the longitudinal direction, which reduces inter-particle entanglements that could impair bulk product flowability. Rather, the dual-taper shape and the characteristic significant alignment of fibers with the longitudinal direction of the fiber-containing particles facilitates gliding of the fiber-containing particles in a bulk product, contributing to flowability and generally imparting glidant properties to the bulk product, even when the fiber-containing particles with the dual-taper shape are mixed with other particles in a bulk product. With respect to dispersibility of fibers into polymer melt during polymer compounding, the significant alignment of fibers in the dual-taper shape of the fiber-containing particles promotes reduced entanglement of fibers as the particles degrade during polymer compounding, facilitating enhanced dispersibility of the fibers into polymer melt during polymer compounding, for example in an extruder.

A second aspect of this disclosure is directed to bulk products comprising a plurality of fiber-containing particles, preferably a plurality of the fiber-containing particles of the first aspect. Such a bulk product may or may not also include other particles in addition to the fiber-containing particles of the first aspect. Such other particles may include particles prepared together with the fiber-containing particles of the first aspect, for example using the method of the third aspect summarized below, but lacking development of the dual-tapered shape or other property or properties characteristic of the fiber-containing particles of the first aspect. The bulk product may consist of, or consist essentially of, fiber-containing particles prepared together with the fiber-containing particles of the first aspect, for example as prepared by the process of the third aspect summarized below, even though some of those fiber-containing particles might not have the dual-tapered shape or another property or properties characteristic of the fiber-containing particles of the first aspect. Such other particles may alternatively or additionally include particles not prepared together with the fiber-containing particles of the first aspect, for example particles blended with the fiber-containing particles after preparation of the fiber-containing particles of the first aspect. Such blended particles may or may not also include fibers, and when such blended particles include fibers, whose fibers may or may not be of the same type (e.g., carbon fibers) as the fibers of the fiber-containing particles of the first aspect. For example, the fiber-containing particles may be blended with conventional chopped tow pellets or other fiber-containing-pellets. In some preferred implementations, the bulk product of this second aspect includes a majority by weight (greater than 50 weight percent) of the fiber-containing particles of the first aspect, or an even larger percentage of the fiber-containing particles. When reference is made to a bulk product comprising a plurality of the fiber-containing particles of the first aspect, properties described for those fiber-containing particles apply to those fiber-containing particles in the bulk product, and not necessarily to other particles in the bulk product not having the dual-tapered shape or other properties of the fiber-containing particles. As noted above, the bulk products with the fiber-containing particles of the first aspect having a dual-tapered shape exhibit an advantageous combination of promoting enhanced flowability for handling prior to compounding, and exhibit enhanced dispersibility of the reinforcing fibers from the particles into polymer melt during extrusion processing to compound the fibers with polymeric matrix.

A third aspect of this disclosure is directed to methods of making fiber-containing particles, for example the fiber-containing particles of the first aspect, and which may be recovered in, or subsequently incorporated into, a bulk product of the second aspect. The method includes rotational tumbling of a mixture of reinforcing fibers (e.g., recycled carbon fibers) and binder material to form agglomerates comprising reinforcing fibers and binder material. Such agglomerates may be recovered as, or may be further processed to prepare in a final form, fiber-containing particles of the first aspect, which may be in the form of a bulk product of the second aspect. Such a method of the third aspect may comprise processing a fiber feed and a binder material to prepare fiber-containing particles including fibers from the fiber feed, wherein the fiber feed comprises reinforcing fibers in a non-continuous form and the processing comprises:

rotational tumbling of a mixture of the reinforcing fibers and the binder material to form agglomerates each comprising a portion of the reinforcing fibers and a portion of the binder material.

As will be appreciated, the fiber-containing particles made by the method of the third aspect will not have the extremely high level of uniformity in size, shape and fiber orientation of conventional chopped tow pellets that are prepared from processing bundles of continuous virgin fibers. Remarkably, the rotational tumbling processing of the method of this third aspect may be advantageously used to prepare batches of fiber-containing agglomerates, many or even most of which develop the desired dual-tapered shape and with a significant degree of longitudinal alignment of fibers with the longitudinal direction of the agglomerates. During the rotational tumbling, a highly random fiber orientation in feed of recycled fibers and with fibers of varying length is transformed to a much more aligned configuration of the fibers, and the more aligned fibers are incorporated into agglomerates having the dual-tapered shape. Such agglomerates may be recovered for use as fiber-containing particles of the first aspect and in the bulk products of the second aspect, or may be further processed to prepare final fiber-containing particles that retain the dual-tapered configuration with significant alignment of fibers. Such further processing may include, for example, drying to remove residual process liquid, typically water, to improve particle integrity and to remove the liquid that might detrimentally volatilize during high polymer melt temperatures encountered during polymer extrusion during compounding. Such further processing may include other processing, as described below.

A fourth aspect of this disclosure is directed to methods for making fiber-reinforced composites, which methods comprise dispersing reinforcing fibers from fiber-containing particles, for example from fiber-containing particles of the first aspect, having the dual-tapered shape, into a matrix. The fiber-containing particles may be provided in a bulk product of the second aspect and may be a result of manufacture by a method of the second aspect. Such a fiber-reinforced composite may be fiber-reinforced polymer, in which the matrix is of polymeric material. When the matrix is a polymeric material, a method of the fourth aspect may include compounding the reinforcing fibers from the fiber-containing particles with polymer for the matrix, for example by extrusion during which the fibers are dispersed in polymer melt in an extruder. Extrudate, including the reinforcing fibers of the first aspect dispersed in polymeric matrix, may be pelletized, and the pellets may be used to prepare molded product forms in a molding operation, for example by injection molding. Such pellets may be used directly as feed to molding, preferably injection molding, or may be used as a masterbatch that is further compounded with and diluted into compatible polymer to prepare a final fiber-reinforced polymer composition with a desired level of fiber loading that is lower than the fiber loading in the masterbatch, and the final fiber-reinforced polymer composition is then used as feed to molding, preferably injection molding.

These and other aspects are further described in the following description, the appended claims and in the Figures. Moreover, a number of feature refinements and additional features are applicable to these aspects, which feature refinements and additional features may be used individually or in any combination within the subject matter of the first aspect or any other aspect of the disclosure. As such, each of the features described in the description below, including in the numbered example implementation combinations and the appended claims, and/or illustrated in the drawings, may be but are not required to be, used with any other feature or combination of features of any of the aspects of this disclosure.

Figure 1:
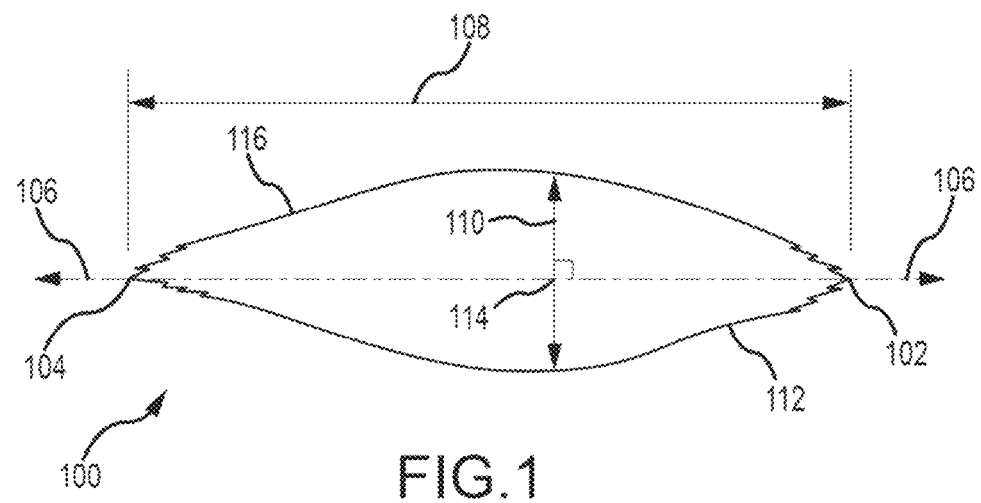
FIG. 1 illustrates features of an example fiber-containing particle of the present disclosure with a dual-tapered shape.

Features shown in the drawings are illustrated to assist with description and understanding of features applicable of various aspects of this disclosure, and features illustrated in the drawings are not necessarily to scale or detailed in every respect.

DETAILED DESCRIPTION

FIG. 1 illustrates features of fiber-containing particles of the present disclosure. As shown in FIG. 1, a fiber-containing particle 100 has an elongated form with a first longitudinal end 102 and a second longitudinal end 104 and a longitudinal direction 106 between the first longitudinal end 102 and the second longitudinal end 104. The longitudinal direction 106 generally coincides with a longitudinal axis of the particle 100. However, it should be appreciated that the fiber-containing particles, such as particle 100, will generally not be symmetrical with respect to such a longitudinal axis, because although the fiber-containing particles of the present disclosure have elongated features, such particles are not perfectly symmetrical about a central axis as a consequence of the method of manufacture. The particle 100 has a particle length dimension 108, which is the linear distance between the first longitudinal end 102 and the second longitudinal end 104. As may be appreciated, the particle length dimension 108 represents a maximum separation distance in the longitudinal direction 106 between the first longitudinal end 102 and the second longitudinal end 104. The particle 100 also has a maximum particle width dimension 110 transverse (perpendicular) to the longitudinal direction 106. The maximum width dimension 110 represents a maximum separation distance between opposing surfaces of the particle 100 on a line transverse to the longitudinal direction 106. The particle 100 has an aspect ratio equal to the particle length dimension 108 divided by the maximum particle width dimension 110. As shown in FIG. 1, the particle 100 has a dual-tapered shape with a first tapered portion 112 tapering in the longitudinal direction 106 away from a longitudinal location 114 of the maximum particle width dimension 110 toward the first longitudinal end 102 and with a second tapered portion 116 tapering in the longitudinal direction 106 away from the longitudinal location 114 toward the second longitudinal end 104.

Figure 2:
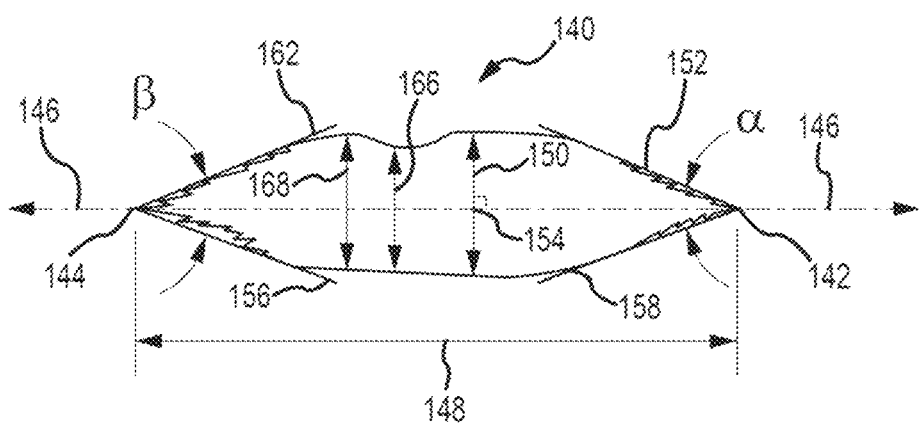
FIG. 2 illustrates features of another example fiber-containing particle of the present disclosure with a dual-tapered shape.

FIG. 2 also illustrates features of a fiber-containing particle of the present disclosure. As shown in FIG. 2, a fiber-containing particle 140 includes a first longitudinal end 142, a second longitudinal end 144, a longitudinal direction 146, a particle length dimension 148, a maximum particle width dimension 150 at a longitudinal location 154, a first tapered portion 152 and a second tapered portion 156. FIG. 2 illustrates that the first tapered portion 152 tapers over a portion of a particle length dimension within a tapering envelope of a right circular cone 158 having an aperture (cone angle) α with an apex coinciding with the first longitudinal end 142. Similarly, the second tapered portion 154 tapers over a portion of the particle length dimension within a tapering envelope of a right circular cone 162 having an aperture (cone angle) β with an apex coinciding with the second longitudinal end 144. As may be appreciated, with the generally asymmetrical shapes of the fiber-containing particles resulting from a method of manufacture of the present disclosure, such an aperture α of a right circular cone envelope of a first tapered portion will typically be different than such an aperture β of a right circular cone envelope of a second tapered portion will typically be different, even if relatively similar in value. Also as illustrated in FIG. 2, it is not necessary for a fiber-containing particle of the present disclosure to taper continuously from a location of the maximum particle width dimension towards each of the first longitudinal end and the second longitudinal end of the particle. In that regard, the example fiber-containing particle 140 illustrated in FIG. 2 includes a localized minimum width 166 and a localized maximum width 168 occurring in the longitudinal direction 146 between the maximum particle width dimension 148 and the second tapered portion 156. Also as may be appreciated, neither a first tapered portion nor a second tapered portion of a fiber-containing particle of the present disclosure must taper completely and continuously to the respective longitudinal end of the fiber-containing particle. For example, the particle 140 may include a small portion near the first longitudinal end 142 that is not continuously tapering or is not within the tapering envelope of the right circular cone 158 and may include a small portion near the second longitudinal end 140 or that is not continuously tapering or is not within the tapering envelope of the right circular cone 162. As may be appreciated, a small bundle of fiber ends may occur in the vicinity of the first longitudinal end 142 and/or the second longitudinal end 144 that interrupt the taper of the first tapered portion 152 and/or the second tapered portion 156 near the respective longitudinal end 142,144.

Figure 3:
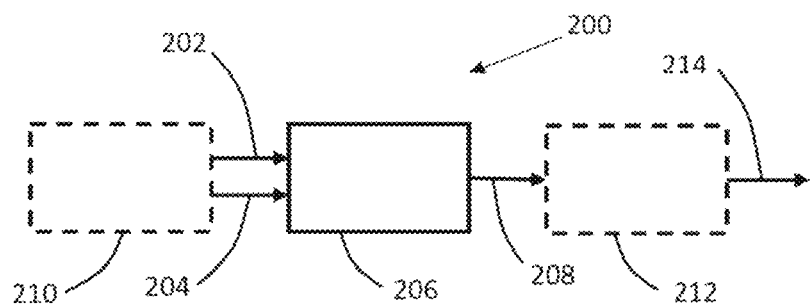
FIG. 3 is a generalized process diagram illustrating some example processing to make fiber-containing particles of the present disclosure.

FIG. 3 shows a general process block diagram illustrating example processing 200 for making fiber-containing particles of the present disclosure including reinforcing fibers held in a particle structure by a binder. The processing 200 includes rotational tumbling 206 of a mixture of reinforcing fibers of a fiber feed 202 and binder material 204 to form agglomerates 208 containing reinforcing fibers in an alignment configuration in which the reinforcing fibers tend to be generally aligned to extend longitudinally in the longitudinal direction of the agglomerate. The rotational tumbling 206 may typically be performed in a rotating vessel, such as a rotating drum or similar rotatable process vessel containing a mixture of reinforcing fibers of the fiber feed 202 and the binder material 204. Each of the fiber feed 202 and the binder material 204 may be introduced into the process vessel as a single addition or in multiple separate additions, and may be added alone or in a mixture or formulation with other materials. As an example, the binder material may be provided in a liquid suspension in which the binder material includes particulates suspended in a carrier liquid, typically an aqueous liquid. The fibers of the fiber feed 202 may be unsized fibers, for example carbon or other fibers which have not been coated with sizing. Alternatively, the fibers of the fiber feed 202 may be sized fibers, for example with base fiber structures of carbon or other fibers coated with a thin layer of sizing material. Sizing is typically a thin polymer coating that provides protection to an underlying base fiber structure (e.g., a carbon fiber structure) and/or acts as a compatibilizer to increase bonding with and/or dispersibility in an anticipated matrix material with which the fiber may be targeted for combination to prepare a fiber-reinforced composite. When the fibers are sized fibers prior to being mixed with binder material, the sizing is considered to be part of the fibers and part of the fiber content of the fiber-containing particles. When the fibers are sized fibers, the sizing typically makes up no more than 5 weight percent of the fibers, preferably not more than 3 weight percent of the fibers, and even more preferably not more than 2 weight percent of the fibers. A portion or all of the fiber feed 202 and binder material 204 may be introduced into the process vessel separately from each other or together in a mixture. The fiber feed 202 and/or the binder material 204 may be introduced into the process vessel prior to or during rotation of the process vessel. The rotating vessel may be operated in a batch mode to prepare batches of the agglomerates 208 from corresponding batches of fiber feed and binder material loaded into the vessel for the rotational processing 206 as a batch, and at the end of the rotational processing 206 of a batch, rotation of the vessel is halted and the agglomerates removed as a processed batch. Alternatively, the rotating vessel may be operated in a continuous or semi-continuous mode, for example with the fiber feed 202 and the binder material 204 introduced continuously or semi-continuously into an upstream portion of the rotating vessel and the agglomerates 208 removed from a downstream portion the rotating vessel.

Figure 4:
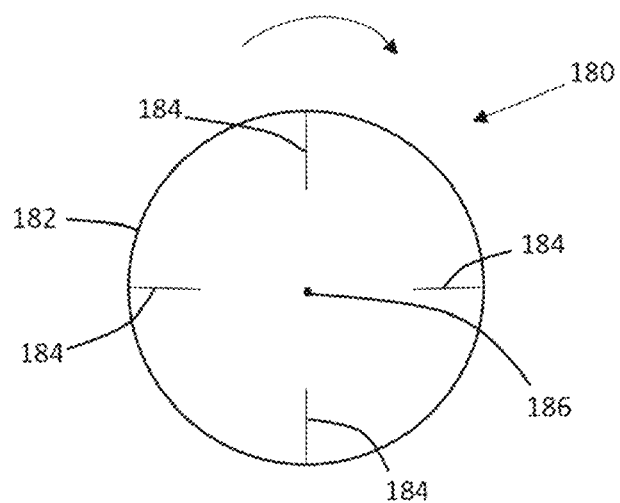
FIG. 4 is an generalized illustration showing internal baffles in a rotatable process vessel, illustrated in the form of a rotating drum.

Some important variables for operation of the rotational tumbling include the length of fibers being processed, the quantity of binder material used relative to the quantity of fibers being processed, the relative amount of liquid (typically water) mixed with the binder material and fibers in the mixture subjected to rotational tumbling, the tangential speed (tip speed) of the inside wall of the rotating vessel during the rotational tumbling and whether or not the rotating vessel includes internal baffles to promote more vigorous tumbling action, including at slower tangential speeds. In general, it has been found that resulting fiber-containing particles become larger as average fiber length becomes longer in the fiber feed. In many situations, a weight average length of the reinforcing fibers in the fiber feed may be in a range of from 1 millimeter to 18 millimeters. Resulting fiber-containing particles may often have a weight average particle length dimension that is about 2-3 times a weight average fiber length in fiber feed to the rotational tumbling. When making fiber-containing particles particularly for compounding with polymer in an extruder, a preferred weight average particle length dimension for the fiber-containing particles is often smaller than about 14 millimeters for compatible processing with many conventional compounding systems. In general, it has also been found that as the proportion of binder material is increased, dispersibility of fibers from the fiber-containing particles during polymer compounding may be reduced, and at some point the amount of binder becomes too large to permit effective degradation of the fiber-containing particles during polymer compounding for effective dispersibility of the reinforcing fibers from the fiber-containing particles. As the amount of binder material is decreased relative to the quantity of fibers in fiber feed to the rotational tumbling, particle integrity of the fiber-containing particles during handling may suffer, and at some point the amount of binder material becomes insufficient to maintain desirable particle integrity during handling operations prior to polymer compounding. In general, the binder material will typically be in an amount in a range of from about 0.5 weight percent to about 11 weight percent relative to the weight of the fibers, which provides about 0.5 weight percent to about 10 weight percent of binder in the final fiber-containing particles. It has also been generally found that if liquid (typically water) content in the process mixture during rotational tumbling becomes either to large or too small, that the development of fiber-containing agglomerates with desired size, shape and particle integrity suffers. Insufficient water results in material not sufficiently bundling during the agglomeration process, that is, the fibers stay largely as discrete fibers. Excessive water results in bundles of larger length, width, and volume, at some point the bundles become so large in one or more such dimensions that the size of the bundles becomes incompatible for practical use with normal compounding and feeding equipment. Additional water beyond this point, will result in a slurry that will not adequately bundle. In general, liquid (typically water) content in the process mixture may often be in a range of from about 10 weight percent to about 50 weight percent relative to the total mixture weight (total weight of fibers plus binder material plus liquid plus any other minor components). The rotating vessel may be in the absence of internal baffles or may include internal baffles to promote more vigorous tumbling action, especially when operating at slower tangential speeds. In general, tangential speeds of the inside wall of the rotating vessel during rotational tumbling may often be a range of from 0.3 to 1.4 meters per second, and with tangential speeds in a range of from about 0.6 meters per second to about 0.8 meters per second working well in many tested operations in a rotating drum not including internal baffles. Rotational speeds too high will lead to fiber sticking against the drum wall without much or any tumbling mechanism for bundling. Rotation speeds to low will lead to a slow or negligible rate of bundle production. Adding internal baffles should permit operation of a rotating vessel at slower speeds to attain satisfactory results compared to the same rotating vessel without internal baffles. When internal baffling is used, the rotating vessel includes at least one, and preferably at least three, internal baffles inwardly projecting into the interior of the vessel from the rotating wall of the vessel. In some preferred implementations, internal baffles may be equally spaced radially about an axis of rotation of the vessel. Baffles may preferably extend from the wall into the vessel a distance of up to 50 percent of a radius of the vessel, and may preferably extend at least 50 millimeters from the vessel wall. Baffles may preferably be oriented to extend into the vessel at a right angle to a tangent to the vessel wall and to extend longitudinally in alignment with the axis of rotation. Alternatively, one or more baffles may be pitched at other than a right angle relative to a tangent to the wall and/or may be longitudinally oriented not in alignment with the axis of rotation (e.g., spiraling along the vessel wall). FIG. 4 illustrates a rotatable process vessel 180, shown in the form of a rotating cylindrical drum, including an vessel wall 182 and four baffles 184 equally spaced radially about an axis of rotation 186 and projecting inwardly from the vessel wall 182 toward the axis of rotation 186. For illustration purposes, FIG. 4 shows a directional arrow indicating rotation of the process vessel 180 in a clockwise direction about the axis of rotation 186, although rotation could alternatively be in a counter-clockwise direction.

Generally, bulk products with the fiber-containing particles tend to exhibit better flowability with increasing untapped bulk density of the bulk product, with increasing tapped bulk density of the bulk product and with decreasing angle of repose of the bulk product. For particular fiber feed having weight average fiber lengths in ranges for processing as disclosed herein, suitable processing conditions to prepare agglomerates for fiber-containing particles may be selected and optimized through normal processing trials with adjustments of the noted processing variables, and without undue experimentation, to obtain fiber-containing particles with suitable sizes and shapes, and exhibiting suitable properties for handling in a bulk product and for degradation and dispersion of fibers during polymer compounding.

As shown in FIG. 3, the illustrated method may include optional preliminary processing 210 to prepare the fiber feed 202 and/or the binder material 204 in a form desired for the rotational tumbling 206 and/or may include optional subsequent processing 212 to prepare a product of final fiber-containing particles 214 from the processing 200. As may be appreciated, in a case when the example method of FIG. 3 does not include subsequent processing 212, the agglomerates 208 may constitute the final fiber-containing particles 214 of the processing of FIG. 3. The fiber-containing particles 214 may be recovered as or incorporated into a bulk product.

Figure 5:
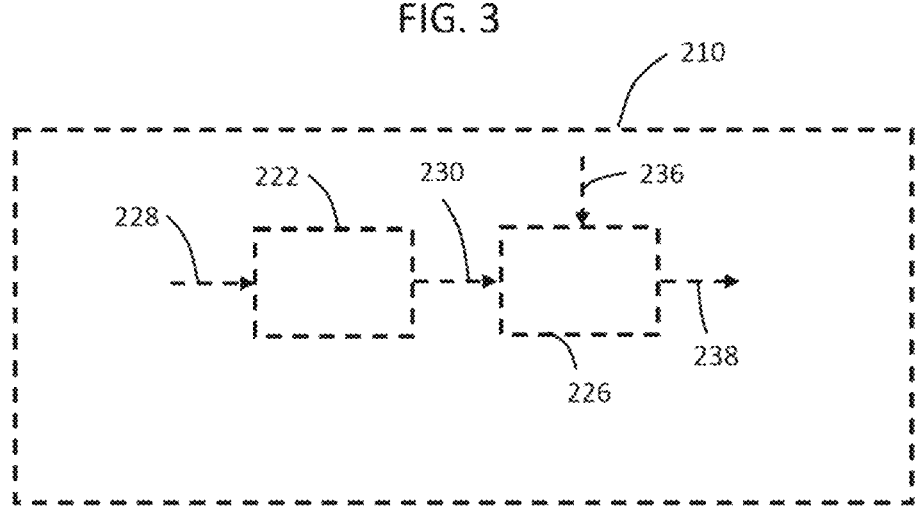
FIG. 5 is a generalized process diagram illustrating some example optional preliminary processing within the general processing of FIG. 3.

FIG. 5 shows a general process diagram of an example of some processing that may be performed during the optional preliminary processing 210 of FIG. 3. The optional preliminary processing 210 may include either one or both of optional processing operations of cutting 222 and premixing 226 performed on a preliminary fiber feed 228 to prepare the fiber feed 202 and/or the binder material 204 in a desired form and/or with desired properties for feed to the rotational tumbling 206. In the optional cutting 222, fibers in a preliminary form are cut to produce cut fibers 230 with a shorter average fiber length than in the preliminary fiber feed 228. An advantage of the rotational tumbling processing of the present disclosure is that it is generally not necessary to remove very short fibers from the processing, and such very short fibers may be successfully incorporated into the agglomerates 208 and the fiber-containing particles 214 along with longer fibers. The shorter fibers may beneficially contribute to fiber reinforcement performance, even if not to the same degree as longer fibers. Retention of very short fibers permits beneficial use of those fibers in reinforcing applications and avoids waste. When the preliminary processing 210 of FIG. 5 includes the premixing 226, a feed of fibers to the premixing 226 is mixed with a binder material feed 236, which includes some or all of the binder material 204 for the rotational tumbling 206, to prepare a premixture 238 including fibers and binder material. The feed of fibers to the premixing 226 may be the cut fibers 230 when the preliminary processing includes the cutting 222 or may be the preliminary fiber feed 228 when the preliminary processing 210 does not include the cutting 222. When the preliminary processing 210 includes the premixing 226, the binder material feed 236 may include some or all of the binder material 204 for the rotational tumbling, and the premixture 238 may include some or all of the binder material 204 and the fiber feed 202 to the rotational tumbling.

Figure 6:
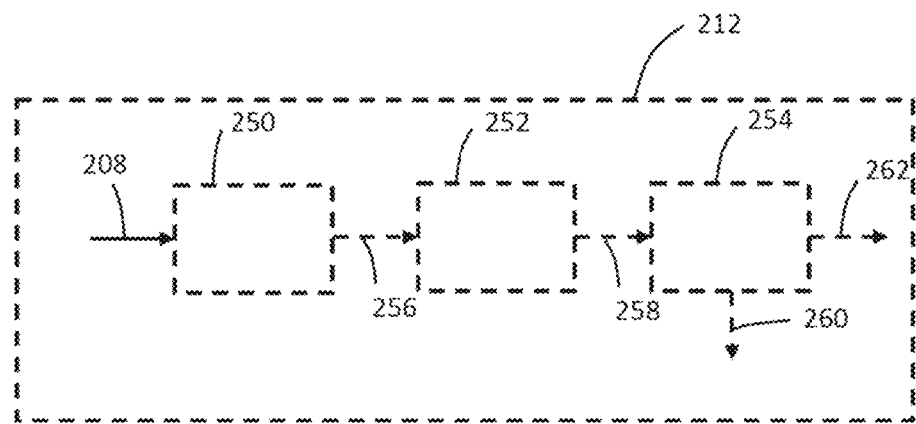
FIG. 6 is a generalized process diagram illustrating some example optional subsequent processing within the general processing of FIG. 3.

FIG. 6 shows a general process diagram of an example of some processing that may be performed during the optional subsequent processing 212 of FIG. 3. The optional subsequent processing 212 may include any one, any two or all three of optional processing operations of drying 250, curing 252 and classifying 254 performed on the agglomerates 208 to prepare the fiber-containing particles 214 with desired properties. In the optional drying 250, the agglomerates 208 are dried to reduce the content of residual liquid, typically water, to a desired low level for the fiber-containing particles 214. During the drying 250, the agglomerates are preferably subjected to elevated temperature and/or reduced pressure to facilitate evaporation of liquid from the agglomerates 208 to prepare dried agglomerates 256. For situations in which the fiber-containing particles 214 will be extruded with polymer, components that may vaporize at high temperatures encountered during the extrusion are often problematic, and this includes any residual water content that could vaporize during the extrusion processing. Accordingly, in some preferred implementations, the water content in the dried agglomerates 256, and in the fiber-containing particles 214, is very low, typically not more than 0.5 weight percent water, and preferably not more than 0.3 weight percent water and even more preferably not more than 0.2 weight percent water. However, there may be some minor level of residual water, for example at least 0.001 weight percent water or even at least 0.01 weight percent water. The optional curing 252 may be included when the binder material requires curing to fully set and form a final binder composition in cured particles 258. Curing may be activated by any appropriate energy source depending on the nature of the binder material 204, for example radiation (light) or heat, with thermal curing being generally more preferred for most curing implementations. The curing 252 may be included, for example, when the binder material 204 comprises thermoset resin (e.g., epoxy resin) that crosslinks during curing. In some implementations the binder material will include thermoplastic polymer, and not thermoset resin. Binder systems using thermoplastic polymers may often be processed without a need for the curing 252. However, some binder systems using thermoplastic polymers may benefit from the processing including the very high temperature treatment of the curing 252, for example to remove chemical functional groups from the thermoplastic polymer that may have been added to the polymer to improve solubility in aqueous solutions or to improve wetting of fibers by the thermoplastic polymer. When the subsequent processing 212 of FIG. 6 includes the drying 250, then a feed to the curing 252 may be the dried particles 256 and otherwise may be the agglomerates 208. When the subsequent processing 212 includes both the drying 250 and the curing 252, the drying 250 and the curing 252 may be performed as separate operations or may be performed in a combined operation, for example with the drying 250 being first performed at a lower elevated temperature and then the curing 252 being performed in the same process equipment (e.g., the same oven) at a higher elevated temperature following the drying 250. In the optional classifying 254 a fiber-containing particulate feed is subjected to size classification to remove off-size particles 260, which includes particles that are larger and/or smaller in one or more dimensions, typically particle length, than a range for such a dimension desired in the fiber-containing particles 214. Resulting classified particles 262 have a narrower distribution of one or more dimensional properties, typically particle length, than particles in the feed to the classifying 254. In a preferred implementation, the classifying 254 includes removing only over-size particles having a dimension, typically particle length, larger than a desired maximum for that dimension in the fiber-containing particles 214. For example, particles having a length longer than a maximum particle length desired for feed to an extruder may be removed during the classifying 254. The classifying 254 may include size-separation of fibers by any one or more techniques, including for example any one or more of screening, vibratory classification, air classification, centrifugal classification, optical sorting and electrostatic classification. When the subsequent processing of FIG. 6 includes the classifying 254, feed to the classifying 254 may be the agglomerates 208, for example when the subsequent processing 212 does not include either the drying 250 or the curing 252, may be the dried particles 256 when the subsequent processing 212 includes the drying 250 and not the curing 252, or may be the cured particles 258 when the subsequent processing 212 includes the curing 252. Also, when the subsequent processing 212 includes both the curing 252 and the classification 254, those processing operations may be performed in a sequence with the curing 252 performed prior to the classification 254, as illustrated in FIG. 6, or may be performed in an alternative sequence with the classification 254 performed prior to the curing 252. One benefit of such an alternative sequence is that fibers in off-size agglomerates 260 that have not been cured may be easier to process to recover the fibers for further processing than in agglomerates that have been cured. Similarly, when the subsequent processing 212 includes both the drying 250 and the classification 254, the sequence of those operations may be as illustrated in FIG. 6, with the drying 250 being performed before the classifying 254, or in an alternative sequence the classifying 254 may be performed prior to the drying 250, in which case the agglomerates 208 may be classified prior to being dried during the drying 250. In preferred processing including the drying 250 and the classifying 254, the drying 250 is performed prior to the classifying 254, as illustrated in the sequence shown in FIG. 6.

Figure 7:
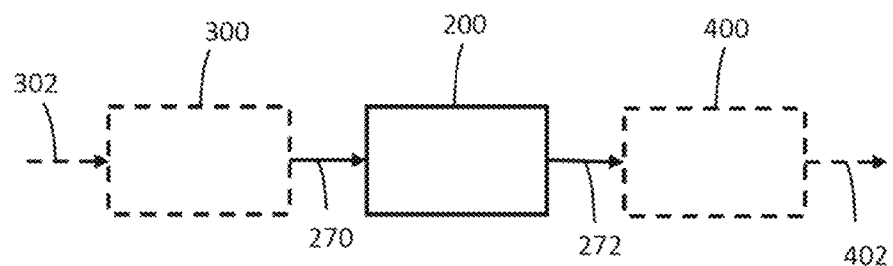
FIG. 7 is a generalized process diagram illustrating some example processing including preparation of a bulk product of the present disclosure.

Reference is now made to FIG. 7, which shows a generalized process diagram of an example of processing for making a fiber-containing product. The processing of FIG. 7 includes the processing 200 of FIG. 3 in which a preliminary feed of fibers 270 is processed to prepare a fiber-containing bulk product 272. The preliminary feed of fibers 270 may for example be provided in the form of the fiber feed 202 of FIG. 3 when the processing 200 does not include the preliminary processing 210, or the preliminary feed of fibers 270 may be in the form of the preliminary fiber feed 228 when the processing 200 includes the preliminary processing 210. The fiber-containing bulk product 272 may be in the form of a batch of the fiber-containing particles 214 of the processing 200 of FIG. 3, which may comprise the agglomerates 208, the dried particles 258, the cured particles 256 or the classified particles 262, depending on whether or not the processing 200 includes the subsequent processing 212 and which one or more of the drying 250, curing 252 and classifying 254 are included in the subsequent processing 212 and in what order. The bulk product 272 may be a blended product including the fiber-containing particles 214 mixed with one or more other particulate components, for example with other fiber-containing particles that may include additional fibers, which may be of the same composition or different composition than the fibers of the fiber-containing particles 214. For example, the bulk product 272 could include a blend of carbon fibers in the fiber-containing particles and additional carbon fibers or additional fibers of a different composition (not carbon fibers) contained in other particles. As shown in FIG. 7, the method optionally includes processing that may be performed before and/or after the processing 200. The processing of FIG. 7 may optionally include recycle processing 300 to process a composite material feed 302 to prepare the preliminary feed of fibers 270 and/or the processing of FIG. 7 may optionally include composite preparation processing 400 to prepare a fiber-reinforced composite product 402.

Figure 8:
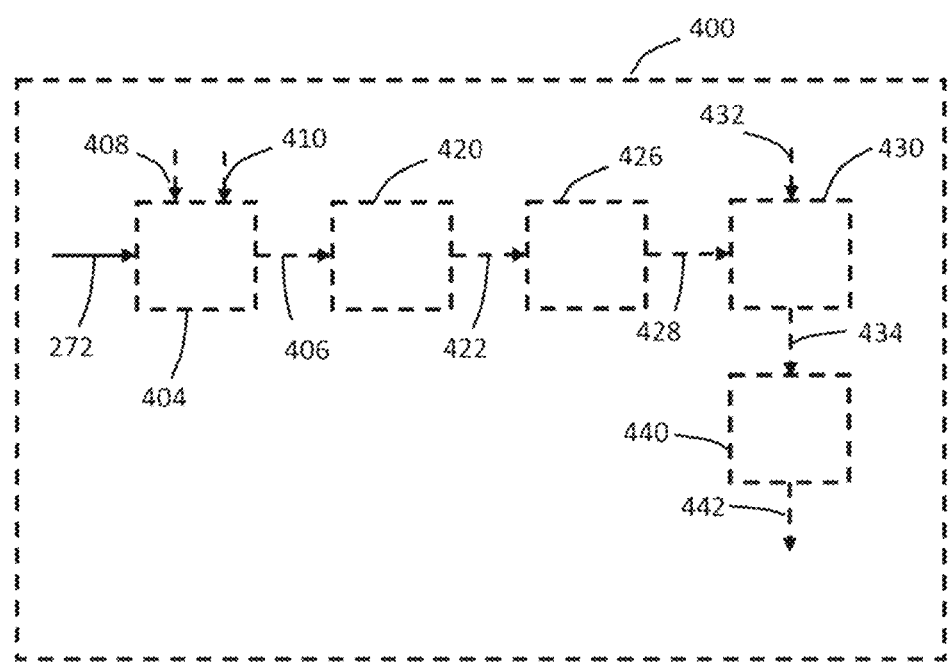
FIG. 8 is a generalized process diagram illustrating some example optional composite preparation processing within the general processing of FIG. 7.

FIG. 8 shows a general process diagram of some example processing that may be performed during the optional composite preparation processing 400 to prepare a fiber-reinforced composite product including reinforcing fibers from the fiber-containing bulk product 270. In the example of FIG. 8, the composite preparation processing 400 may include dispersing 404 fibers of the fiber-containing bulk product 272 in a matrix to form a fiber-reinforced composite 406. Material for the matrix may be provided in a matrix material feed 408. Additional components 410 may also be fed to the dispersing 404 to be included in the composite 406. Such additional components 410 may include additives such as functional or non-functional filler and/or processing aids. The additional components 410 may include additional reinforcing fibers, in addition to the reinforcing fibers from the fiber-containing bulk product 272, and which additional reinforcing fibers may be of the same type or a different type than the fibers in the fiber-containing bulk product 272. In some preferred processing implementations, the dispersing 404 includes extruding polymeric material of the matrix material feed 408 and adding fiber-containing particles of the bulk product 272 into the polymeric material during the extruding, in which case the composite material 406 may be in the form of an extrudate.

With continued reference primarily to FIG. 8, the optional processing 400 may also include cooling 420, during which the composite 406 is cooled, for example by passing the composite 406 through a bath of cooling liquid (e.g., water). This processing may be desired when the composite as prepared during the dispersing 404 is at an elevated temperature, such as in the case of extrusion. A cooled composite 422 from the cooling 420 may be subjected to pelletizing 426 to prepare pellets 428 of fiber-reinforced composite material. The pelletizing 426 may include, for example, cutting an extruded strand of desired diameter into cylindrically-shaped pellets of a desired length. After the pelletizing 426, the pellets 428 may be subjected to blending 430 during which the pellets 428 may be mixed with one or more other particulate component 432 that is different than the pellets 428 to form a blended bulk product 434. The optional processing may also include molding 440, in which a fiber-reinforced composite feed is molded, preferably by injection molding, to prepare a molded product 442. The fiber-reinforced composite feed to the molding 400 may be, for example, the pellets 428 when the processing 400 does not include the blending 430, or may be the blended bulk product 434 when the processing 400 includes the blending 430. As may be appreciated, the pellets 428 or the blended bulk product 434 may be sold as a bulk product, and buyer may use the pellets 428 or bulk product 434 for performance of the molding 440 or for another purpose.

Figure 9:
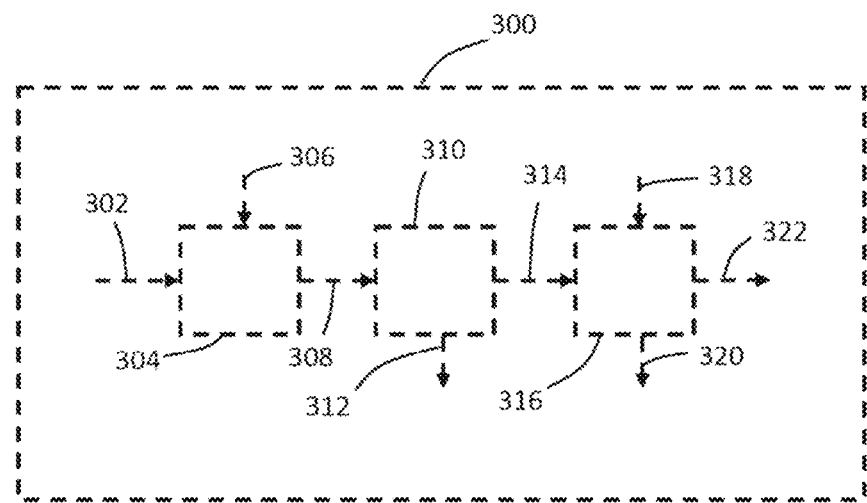
FIG. 9 is a generalized process diagram illustrating some example optional recycle processing to provide a preliminary feed of fibers within the general processing of FIG. 7.

With continued reference to the processing illustrated in FIG. 7, the preliminary feed of fibers 270 may comprise virgin fibers and/or may comprise recycled fibers. In preferred implementations of the processing of FIG. 7, the preliminary feed of fibers 270 includes recycled fibers (e.g., recycled carbon fibers). Such recycled fibers may be obtained from any source for feed to the processing 200, and may optionally be prepared through performance of the optional recycle processing 300 to recover recycled fibers from a composite material feed 302. The composite material feed 302 to the optional recycle processing 300 may comprise scrap and/or waste of fiber-reinforced material that is processed in the recycle processing 300 to free recycled fibers from matrix of the composite material feed 302 and recovery of recycled reinforcing fibers for use in the preliminary feed of fibers 270 to prepare the fiber-containing bulk product 272. The composite material feed 302 may include a matrix of a thermoset polymer composition or thermoplastic polymer composition. A thermoset matrix may include an uncured thermoset resin (e.g., prepreg) or a cured thermoset polymer composition. The recycling processing 300 may include any processing technique for separating reinforcing fibers from the matrix of the composite material feed 302. Some example processing techniques include pyrolysis, solvation, or depolymerization of the matrix to free the fibers for recovery. Some preferred implementations of the recycle processing 300 include processing disclosed in any of U.S. Pat. Nos. 10,487,191; 10,610,911 and 10,829,611. In some such preferred implementations of the recycle processing 300, the composite material feed 302 is subjected to first treating with a first, normally-liquid solvent to dissolve matrix material and free fibers for recovery, followed by separating first solvent loaded with dissolved matrix material from freed fibers and then followed by second treating the freed fibers with a second solvent, typically of normally-gaseous material such as carbon dioxide, to remove a residual portion of first solvent. FIG. 9 shows a general process diagram of an example of such processing that may be performed during the optional recycle processing 300 to process the composite material feed 302 to prepare the preliminary feed of fibers 270 containing recycled fibers for feed to the processing 200. As seen FIG. 9, the composite material feed 302 is subjected to first treating 304, during which the composite material feed 302 is contacted with a first solvent 306, preferably a normally-liquid solvent, to dissolve most or even essentially all of matrix material from the composite material feed 302, leaving reinforcing fibers freed from the composite structure. A resulting mixture 308 including first solvent loaded with dissolved matrix material and freed reinforcing fibers is then subjected to liquid-solid separation 310, during which most, and preferably all but a small residual amount, of the loaded first solvent is recovered in a separated liquid 312 and most, and preferably essentially all, of the freed fibers are recovered in a solid residue 314, which also includes a residual amount of the first solvent. The solid residue 314 is then subjected to second treating 316, during which the solid residue 314 is contacted with a second solvent 318, which is a solvent for the first solvent and not a solvent for the reinforcing fibers. A loaded second solvent 320, containing a dissolved residual portion of the first solvent, and a dried solid residue 322, containing freed reinforcing fibers from which the residual portion of the first solvent has been removed, are recovered from the second treating 316. The dried solid residue 322 may be used directly as recovered from the second treating 316 as the preliminary feed of the fibers 270 to the processing 200, or may be further processed as desired to prepare the preliminary feed of the fibers 270.

As used herein, the term "bulk product" refers to a product in particulate form, for example in the form of a powder, lumps or granules, including intra-particle and inter-particle voids. The term may be used interchangeably with the term "bulk material".

As used herein, the term "bulk density" refers to the apparent density of a quantity of bulk product. Bulk density may be determined by dividing the mass of the quantity of the bulk product by the volume occupied by the quantity of the bulk product, including intra-particle and inter-particle voids.

As used herein, the terms "untapped bulk density" and "free settling bulk density" are interchangeable and refer to bulk density of a quantity of bulk product determined according to the following procedure, which is similar to but modified relative to ASTM Standard D7481-18:

Weigh and record the weight in grams of a clean, empty, 0.5 L straight-walled beaker. The beaker may be procured, for example from a Cole-Parmer graduated Griffin Beaker #SK-34502-46, or an equivalent container.

Fill the graduated beaker to the top graduation by gently sifting particles of the bulk product from a container into the beaker, ensuring a neutral fill. A funnel may be used if desired or convenient, to ensure a neutral fill.

Weigh in grams the filled beaker and determine the weight of particles in the beaker as the difference in weight relative to the empty beaker, to an accuracy of at least 0.1 gram. The difference in weight may be determined directly by zeroing the balance to the tare weight of the empty beaker before adding the bulk product, or the total weight of the beaker and bulk product may be determined and the weight of the particles in the filled beaker may be determined by difference relative to the weight of the empty beaker.

The bulk density (in grams per liter) is equal to two times the determined weight of the particles in the filled beaker.

As used herein the term "tapped bulk density" refers to bulk density of a quantity of bulk product determined according to the following procedure, which is also similar to but modified relative to ASTM Standard D7481-18:

First complete the steps noted above for determining untapped bulk density.

Then move the filled beaker to a hard surface, such as the surface table or counter, and repeatedly tap the bottom of the beaker on the surface by repeatedly lifting the beaker 1-2 centimeters off of the surface and letting it fall back to the surface at a frequency of approximately 90 taps per minute.

Continue the tapping until the settled volume of the bulk product in the beaker remains essentially constant (within approximately 2%) for at least 10 taps.

Measure the settled volume of the bulk product in the beaker to the nearest 5 milliliters.

Determine the tapped bulk density (in grams per liter) by dividing the weight in grams of the bulk product, determined during prior processing to determine untapped bulk density, by the measured settled volume in liters of the bulk product.

As used herein, "angle of repose" of a bulk product refers to an angle of repose of a stacked pile of the bulk product determined by the following procedure, which is similar to but modified relative to ASTM Standard C 1444-00:

Provide a funnel of sufficient size to hold a 150 gram sample of the bulk product and with the funnel having an outlet diameter of 2.75 inches (6.9 centimeters). For example the funnel may be a standard 48 oz plastic long neck funnel Model #LX-1614 as sold by Home Depot or equivalent. Any given funnel may need to be truncated to provide the appropriate outlet size.

With the outlet covered by a planar object, such as a flat piece of cardboard, pour 150 grams of the bulk product into the funnel.

With the funnel outlet held at a height of 4.5 inches (11.4 centimeters) above a clean sheet of paper (e.g., clean sheet of printer paper), remove the cover from the funnel outlet and permit the bulk product to flow out of the funnel outlet and to form a pile on the sheet of paper. The funnel should be held on a stand configured not to interfere with development of the pile. A cylindrical cardboard stand of 10 inches (25.4 centimeters) diameter has generally been adequate for bulk products of the fiber-containing particles of this disclosure.

After flow of the bulk product from the funnel has ceased and the pile of the bulk product has stopped settling, measure and record two perpendicular diameters of the base of the stack and measure the height of the stack, each to the nearest 0.25 inch (0.64 centimeter), and average the measured diameters.

Calculate the angle of repose, as follows:

$AR = \tan^{-1}(2h/d)$ where, AR is the angle of repose, h is the height of the pile and d is the averaged diameter of the base of the pile.

EXAMPLES

Example 1

Batches of fiber-containing particles are prepared generally according to the following procedure:

1. A feed of recycled carbon fibers previously recovered from a prepreg composite was cut using a guillotine chopping machine set at a 3 millimeter, 6 millimeter or 12 millimeter cut setting. As will be appreciated, cut fibers may be longer or smaller than the cut setting based on how long the original fiber was before being cut by the guillotine cutting blade and the angle at which the fiber was disposed relative to the cutting blade when it was cut. To obtain greater uniformity in cut length of fibers, the fiber was processed through the chopper three or four times.

2. From 10 to 30 kilograms of the final chopped fibers were poured into a 55 gallon drum and then water and binder material were added to form a mixture with the chopped fibers, with the mixture containing 20 to 35 weight percent water, 1 to 5 weight percent binder material and the balance being the chopped fibers. Some example binders that were tested are listed in Table 1. The water and binder material were pre-mixed and the water and binder mixture was poured over the fibers in the 55 gallon drum. Generally, a greater weight percentage of water was added for chopped fibers prepared at the 3 millimeter chop setting and a smaller weight percentage of water was added for chopped fibers prepared at the 6 millimeter chop setting or 12 millimeter chop setting. After adding the water and binder mixture, the drum was closed.

3. The closed drum was placed on a drum roller and the drum with the contents were rolled for a total time of about 120 to 210 minutes with the rotational speed of the drum roller set at 24 revolutions per minute, which equates to a tangential speed of about 0.7 meters per second at the inner wall of the drum cylinder. Rolling of the drum was briefly interrupted about every 30 minutes to check the agglomeration progress and to scrape excess fiber off the walls of the drum.

4. Agglomerates resulting from the drum rolling of step 3 were removed from the drum and classified using a vibrating screen sorter operated with a screen having screen openings sized at ¼ inch (6.35 mm), ⅜ inch (9.53 mm) or ½ inch (12.7 mm) to remove oversize particles not passing through the screen.

5. The classified agglomerates were dried in an oven at 300° F. (149° C.) for 8 to 12 hours, to remove essentially all water.

Figure 10:
FIG. 10 is a photographic image of an example feed of recycled carbon fibers, in which recycled carbon fibers have a high degree of randomness in orientation in a cotton ball-like structure.

FIG. 10 is a photographic image of an example of recycled carbon fibers prior to chopping. As seen in FIG. 10, the recycled carbon fibers are in a cotton ball-like structure including significant randomness in orientation of the carbon fibers.

TABLE 1

Example Tested Binders

| Product Name | Source | Material Type |
|---|---|---|
| Hydrosize U501 | Michelman | Polyurethane Dispersion |
| Hydrosize U201 | Michelman | Polyurethane Dispersion |
| Hydrosize U2022 | Michelman | Polyurethane Dispersion |

Figure 11:
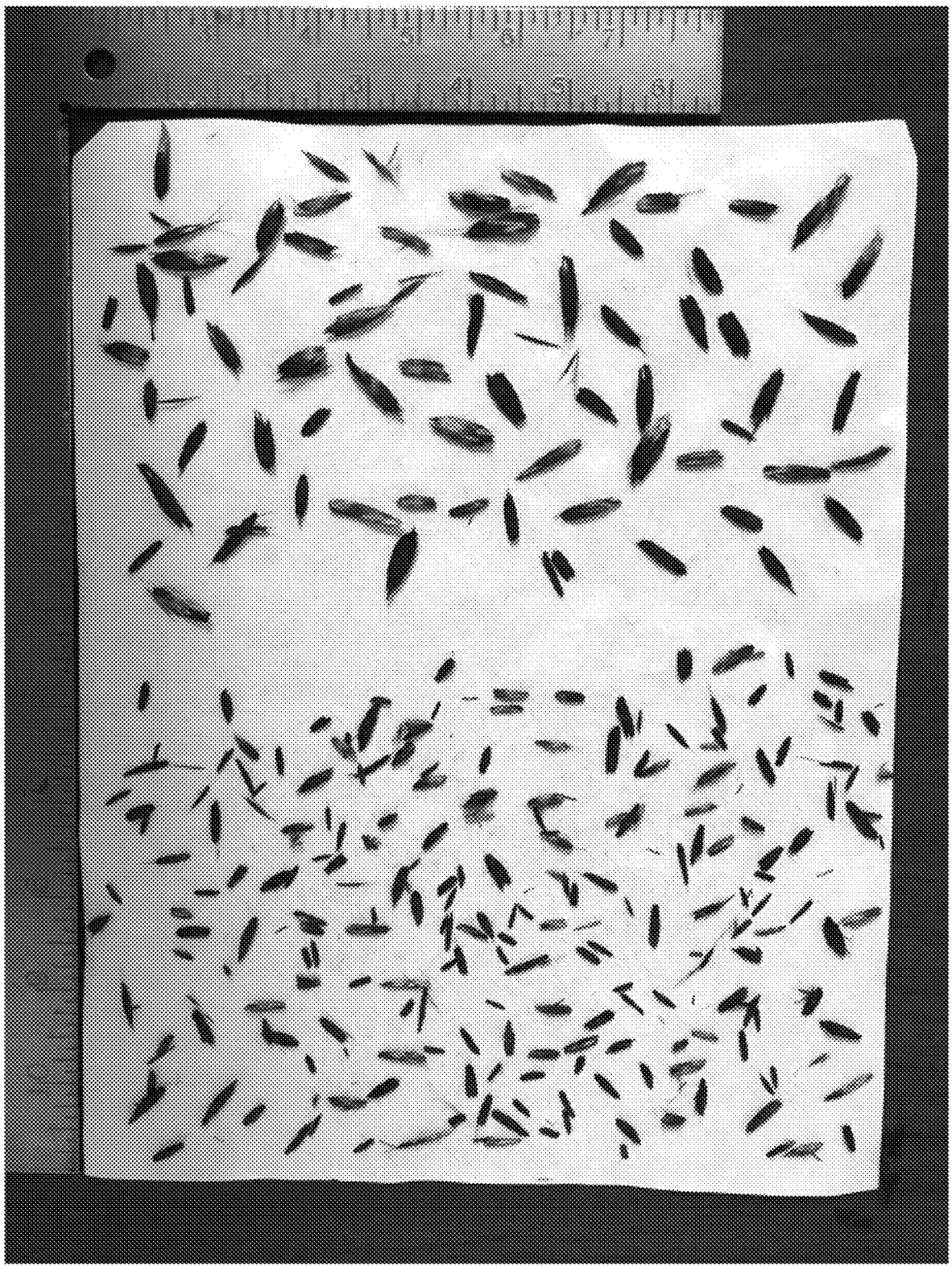
FIG. 11 is a photographic image of two different example prepared batches of fiber-containing particles made with recycled carbon fibers, with the different batches prepared from recycled carbon fibers cut to different lengths and resulting in fiber-containing particles of different sizes.

FIG. 11 is a photographic image of two example prepared batches of fiber-containing particles made with recycled carbon fibers and with the fiber-containing particles of each batch dispersed on a white paper background for enhanced visibility of individual particles of each batch. One example batch, shown in the top portion of the image, was prepared with the chopper operated at the 6 millimeter setting and the resulting fiber-containing particles have an average particle length of about 12 millimeters. The other example batch, shown in the bottom portion of the image, was prepared with the chopper operated at the 3 millimeter setting and the resulting fiber-containing particles have an average particle length of about 8 millimeters. In each batch, the elongated shape of the particles and the general alignment of the fibers with the longitudinal direction of the particles is visible, and with many of the particles having a well-developed dual-tapered shape.

Figure 12:
FIG. 12 is a photographic image of a bulk product with an example batch of fiber-containing particles in a beaker.
Figure 13:
FIG. 13 is a photographic image looking down on the bulk product of FIG. 12.

FIG. 12 is a photographic image of a bulk product in a beaker prepared with particles from a batch of fiber-containing particles produced from feed of recycled carbon fibers chopped using the 6 millimeter chopper setting, and FIG. 13 is a photographic image looking down on such a bulk product. This bulk product was tested for bulk density and angle of repose, according to methods described herein. The bulk product had an untapped bulk density of about 200 grams per cubic liter, a tapped bulk density of about 300 grams per cubic liter and an angle of repose of about 36°. These properties indicate good flowability of the bulk product, suitable for feed to an extruder for compounding with polymer.

Figure 14:
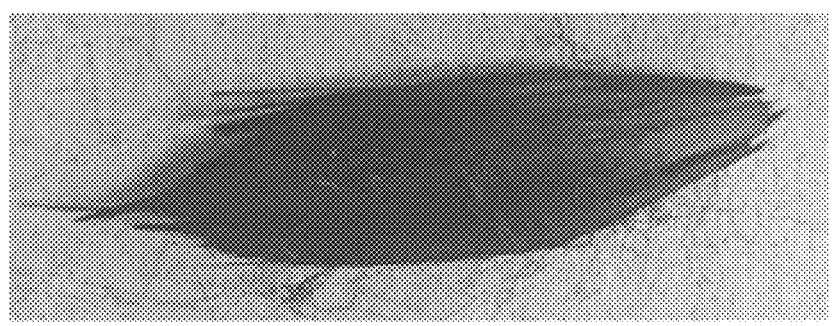
FIG. 14 is a photographic image a fiber-containing particle showing a well-developed dual-tapered shape and with fiber alignment in the longitudinal direction of the particle.

FIG. 14 is a photographic image of a single particle from a batch of fiber-containing particles produced from feed of recycled carbon fibers cut with the 6 mm chopper setting. The particle has a length of about 12 millimeters, with a well-developed dual-tapered particle shape and with a high degree of longitudinal alignment of fibers with the longitudinal direction of the particle. As seen in FIG. 14, the example fiber-containing particle is essentially free of fibers protruding from the particle perpendicular to the longitudinal direction of the particle, which helps facilitate good flowability of such particles in a bulk product.

Figure 15:
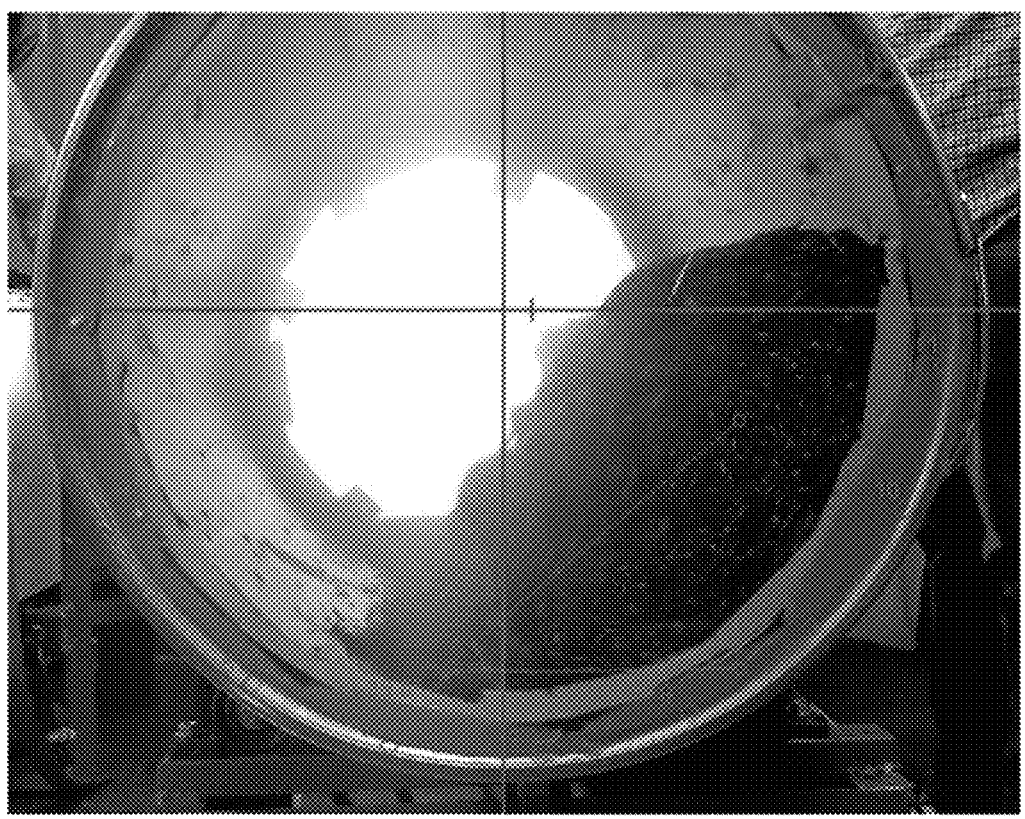
FIG. 15 is a photographic image showing the inside of a rotating drum with agglomerates made from recycled carbon fibers.

FIG. 15 is a photographic image showing the inside of a rotating 55-gallon drum with formed agglomerates made from recycled carbon fibers chopped using the 6 millimeter chopper setting, and with the drum fitted with transparent end caps to permit viewing contents within the rotary drum during rotational tumbling.

Example 2

Extrusion tests were run on batches of fiber-containing particles made with recycled carbon fibers prepared as described in Example 1 to prepare carbon fiber-reinforced composites. Table 2 summarizes some polymers that were tested for compounding with fiber-containing particles prepared with different chopper settings. Each polymer was extruded in a twin-screw extruder. Some samples were extruded in a Leistritz 27 mm twin-screw extruder and other samples were extruded in other extruders. The batches of fiber-containing particles were prepared using a chopper setting at 12 millimeters, 6 millimeters or 3 millimeters. The fiber-containing particles were fed to the extruder from normal bulk handling systems to provide various levels of loading of the recycled percent carbon fiber loading in the extrudate, as summarized in Table 2. Feed to the Leistritz extruder was from a K-Tron T20 vibratory loss-in-weight feeder. The extrudate was passed through a circular die (e.g., two-hole circular die) die and the resulting extrudate strands were cut into cylindrical pellets. The particles generally fed well from feed hoppers and into the extruder during extrusion and with the carbon fibers generally dispersing well from the fiber-containing particles into the polymer melt. Pellets for some of the tests were used as feed to injection molding to prepare molded test coupons of carbon fiber-reinforced material from the pellets. Some extrudate pellets made with polyamide polymer were injection molded to ISO 527-2 Type 1A tensile bars and ISO 197-2 Type D impact specimens. Molded material showed comparable tensile strength, modulus, and impact strength relative to manufacturer specifications for a 40% carbon fiber reinforced commercial compounded material with the same baseline polyamide polymer and virgin carbon fibers. Test specimen molding went smoothly given appropriately high-pressure injection and a heated tool. Some molded test specimens were subjected to XCT (x-ray computed tomography) investigation, which showed similar void and fiber distributions between the test specimens and corresponding baseline commercial compounded material with virgin carbon fibers.

TABLE 2

Example Thermoplastic Polymers Extruded

| Polymer Product Name | Polymer Type | Chopper Setting (3 mm, 6 mm, or 12 mm) | Carbon Fiber Loading (Weight %) |
|---|---|---|---|
| Chase Pryme N100L | Polyamide 6 | 6 mm | 40 |
| BASF Ultramid ® A3W-Q601 | Polyamide 6,6 | 6 mm | 30 & 40 |
| Arkema Rilsan ® | Polyamide 11 | 6 mm & 12 mm | 20, 25 & 30 |
| Braskem F30 | Polypropylene homopolymer | 6 mm | 15 & 20 |
| Formosa Formolene ® 4100N | Polypropylene homopolymer | 3 mm | 10, 20, 30 & 40 |

Exemplary Implementation Combinations

Some other contemplated embodiments of implementation combinations for various aspects of this disclosure, with or without additional features as disclosed above or elsewhere herein, are summarized in the numbered paragraphs presented below, and in the appended claims:

1. A fiber-containing particle with reinforcing fibers bound in a particle structure, and optionally the fiber-containing particle is beneficial for compounding the reinforcing fibers with polymer, the fiber-containing particle comprising:

from 90 weight percent to 99.5 weight percent reinforcing fibers;

from 0.5 weight percent to 10 weight percent binder holding the reinforcing fibers in the particle structure;

a particle length dimension in a range of from 3 millimeters to 40 millimeters, being a maximum separation distance in a longitudinal direction between first and second longitudinal ends of the fiber-containing particle;

a maximum particle width dimension transverse to the longitudinal direction at a longitudinal location between the first and second longitudinal ends;

an aspect ratio equal to the particle length dimension divided by the maximum particle width dimension of at least 1.5;

a dual-tapered shape comprising a first tapered portion tapering in the longitudinal direction away from the longitudinal location toward the first longitudinal end and a second tapered portion tapering in the longitudinal direction away from the longitudinal location toward the second longitudinal end. Optionally the fiber-containing particle may include small quantities of material other than the reinforcing fibers and binder, for example a small quantity (typically no more than 0.5 weight percent and preferably even less) of residual water and/or small quantities of processing additives. The reinforcing fibers may optionally be sized fibers, unsized fibers or a combination of sized and unsized fibers.

2. The fiber-containing particle of paragraph 1, comprising an amount of the reinforcing fibers in a range having a lower limit selected from the group consisting of 91 weight percent, 92 weight percent and 93 weight percent and an upper limit selected from the group consisting of 99 weight percent, 98 weight percent and 97 weight percent.

3. The fiber-containing particle of either one of paragraph 1 or paragraph 2, comprising the binder in an amount in a range having a lower limit selected from the group consisting of 1 weight percent, 2 weight percent, 2.5 weight percent and 3 weight percent and an upper limit selected from the group consisting of 9 weight percent, 7 weight percent, 6 weight percent and 5 weight percent. One preferred range is from 2 weight percent to 6 weight percent of the binder, and another preferred range is from 2.5 weight percent to 5 weight percent of the binder.

4. The fiber-containing particle of any one of paragraphs 1-3, wherein the reinforcing fibers are in an aligned configuration in which at least 70 weight percent, and preferably at least 80 weight percent and more preferably at least 85 weight percent, of the reinforcing fibers extend longitudinally within an angle of 20° of the longitudinal direction, and preferably with an angle of 10° of the longitudinal direction.

5. The fiber-containing particle of any one of paragraphs 1-4, wherein the particle length dimension is in a range having a lower limit selected from the group consisting of 3.5 millimeters, 4 millimeters, 5 millimeters and 6 millimeters.

6. The fiber-containing particle of any one of paragraphs 1-5, wherein the particle length dimension is in a range having an upper limit selected from the group consisting of 30 millimeters, 20 millimeters, 16 millimeters and 14 millimeters. One preferred range for the particle length dimension is from 5 millimeters to 16 millimeters, with an even more preferred range being from 6 millimeters to 14 millimeters.

7. The fiber-containing particle of any one of paragraphs 1-6, wherein the aspect ratio is in a range having a lower limit selected from the group consisting of 1.7, 1.8 and 1.9.

8. The fiber-containing particle of any one of paragraphs 1-7, wherein the aspect ratio is in a range having an upper limit selected from the group consisting of 6, 4 and 3. One preferred range for the aspect ratio is from 1.8 to 4.

9. The fiber-containing particle of any one of paragraphs 1-8, wherein the first and second tapered portions each tapers over a longitudinal distance of at least 20 percent (and preferably at least 25 percent) of the longitudinal length within a tapering envelope of a right circular cone with an apex at the respective said longitudinal end and an aperture of no larger than 45°, preferably no larger than 40°, more preferably no larger than 37° and even more no larger than 35°, and preferably in any case the aperture is at least 10°. One preferred range for the aperture is in a range of from 14° to 34°.

10. The fiber-containing particle of any one of paragraphs 1-9, wherein the binder comprises a material selected from the group consisting of polyether polyurethane (preferably cured), polyester polyurethane (preferably cured), maleated polypropylene, polyaryletherketone (PAEK), and epoxy polymers (preferably cured).

11. The fiber-containing particle of any one of paragraphs 1-10, wherein the maximum particle width dimension is in a range having a lower limit selected from the group consisting of 1 millimeter, 2 millimeters, 3 millimeters and 4 millimeters and an upper limit selected from the group consisting of 10 millimeters, 8 millimeters, 6 millimeters and 5 millimeters. As will be appreciated, the maximum particle width dimension will generally be smaller for a fiber-containing particle having a shorter particle length dimension.

12. The fiber-containing particle of any one of paragraphs 1-11, comprising not more than 0.5 weight percent water, preferably not more than 0.3 weight percent water and more preferably not more than 0.2 weight percent water.

13. A bulk product with reinforcing fibers, the bulk product comprising a plurality of fiber-containing particles, the plurality of fiber-containing particles comprising:
from 90 weight percent to 99.5 weight percent reinforcing fibers; and
from 0.5 weight percent to 10 weight percent binder holding the reinforcing fibers in a particle structure of the fiber containing particles;
each said fiber-containing particle comprising:
a particle length dimension in a range of from 3 millimeters to 40 millimeters, being a maximum separation distance in a longitudinal direction between first and second longitudinal ends of the fiber-containing particle;
a maximum particle width dimension transverse to the longitudinal direction at a longitudinal location between the first and second longitudinal ends;
an aspect ratio equal to the particle length dimension divided by the maximum particle width dimension of at least 1.5; and
a dual-tapered shape comprising a first tapered portion tapering in the longitudinal direction away from the longitudinal location toward the first longitudinal end and a second tapered portion tapering in the longitudinal direction away from the longitudinal location toward the second longitudinal end; and
preferably, the plurality of fiber containing particles are a plurality of the fiber-containing particles of any one of paragraphs 1-12; and
optionally the bulk product comprises at least 25 weight percent of the fiber-containing particles, or greater than 50 weight percent of the fiber-containing particles, or at least 75 weight percent of the fiber-containing particles or at least 90 weight percent of the fiber-containing particles, and also optionally the bulk product comprises some, further optionally at least 10 weight percent, of particles other than the fiber-containing particles. The bulk product may optionally consist of or consist essentially of only the fiber-containing particles.

14. The bulk product of paragraph 13, comprising:
a weight average particle length dimension of the fiber-containing particles in a range of from 3 millimeters to 40 millimeters, wherein the weight average particle length dimension is an average on a weight basis of the particle length dimensions of the fiber-containing particles; and
a weight average aspect ratio of the fiber-containing particles of at least 1.5, wherein the weight average aspect ratio is an average on a weight basis of the aspect ratios of the fiber-containing particles.

15. A bulk product comprising a plurality of fiber-containing particles, the plurality of fiber-containing particles comprising:
from 90 weight percent to 99.5 weight percent reinforcing fibers;
from 0.5 weight percent to 10 weight percent binder, holding the reinforcing fibers in a particle structure;
each said fiber-containing particle comprising:
a particle length dimension, being a maximum separation distance in a longitudinal direction between first and second longitudinal ends of the particle;
a maximum particle width dimension transverse to the longitudinal direction at a longitudinal location between the first and second longitudinal ends;
an aspect ratio equal to the particle length dimension divided by the maximum particle width dimension; and
a dual-tapered shape comprising a first tapered portion tapering in the longitudinal direction away from the longitudinal location toward the first longitudinal end and a second tapered portion tapering in the longitudinal direction away from the longitudinal location toward the second longitudinal end; and
the plurality of fiber-containing particles further comprising:
a weight average particle length dimension of the fiber-containing particles is in a range of from 3 millimeters to 40 millimeters, wherein the weight average particle length dimension is an average on a weight basis of the particle length dimensions of the fiber-containing particles; and
a weight average aspect ratio of the fiber-containing particles of at least 1.5, wherein the weight average aspect ratio is an average on a weight basis of the aspect ratios of the fiber-containing particles; and
optionally the bulk product comprises at least 25 weight percent of the fiber-containing particles, or greater than 50 weight percent of the fiber-containing particles, or at least 75 weight percent of the fiber-containing particles or at least 90 weight percent of the fiber-containing particles, and also optionally the bulk product comprises some, further optionally at least 10 weight percent, of particles other than the fiber-containing particles. The bulk product may optionally consist of or consist essentially of only the fiber-containing particles.

16. The bulk product of either one of paragraph 14 or paragraph 15, wherein the weight average particle length dimension is in a range having a lower limit selected from the group consisting of 3.5 millimeters, 4 millimeters, 5 millimeters and 6 millimeters.

17. The bulk product of any one of paragraphs 14-16, wherein the weight average particle length dimension is in a range having an upper limit selected from the group consisting of 30 millimeters, 20 millimeters, 16 millimeters and 14 millimeters. One preferred range for the weight average particle length dimension is from 5 millimeters to 16 millimeters, with an even more preferred range being from 6 millimeters to 14 millimeters.

18. The bulk product of any one of paragraphs 14-17, wherein the particle length dimensions of at least 75 weight percent, preferably at least 80 weight percent, more preferably at least 85 weight percent and even more preferably at least 90 weight percent of the fiber-containing particles are in a range having a lower limit of 0.5 times, and preferably 0.7 times, the weight average particle length dimension and an upper limit of 2 times, and preferably 1.8 times, the weight average particle length dimension.

19. The bulk product of any one of paragraphs 14-18, wherein the particle length dimensions of at least 2 weight percent, or even at least 5 weight percent, or even at least 10 weight percent, of the fiber-containing particles is outside of a range of from 0.8 times the weight average particle length dimension to 1.2 times the weight average particle dimension.

20. The bulk product of any one of paragraphs 14-19, wherein the particle length dimensions of at least 98 weight percent of the fiber-containing particles are no larger than 3 times the weight average particle length dimension.

21. The bulk product of any one of paragraphs 14-20, wherein the weight average aspect ratio is in a range having a lower limit selected from the group consisting of 1.7, 1.8 and 1.9.

22. The bulk product of any one of paragraphs 14-21, wherein the weight average aspect ratio is in a range having an upper limit selected from the group consisting of 6, 4 and 3. One preferred range for the weight average aspect ratio is from 1.8 to 4.

23. The bulk product of any one of paragraphs 14-22, wherein the aspect ratios of at least 75 weight percent, preferably at least 80 weight percent, more preferably at least 85 weight percent and even more preferably at least 90 weight percent of the fiber-containing particles are in a range having a lower limit of 1.5 and an upper limit of 4.

24. The bulk product of any one of paragraphs 14-23, wherein the aspect ratios of at least 2 weight percent, or even at least 5 weight percent, of the fiber-containing particles is outside of a range of from 0.8 times to 1.2 times the weight average aspect ratio.

25. The bulk product of any one of paragraphs 15-24, wherein each said fiber-containing particle of the plurality of fiber-containing particles is according to, or including any feature of, any one of paragraphs 1-12.

26. A method for making a fiber-reinforced composite, the method comprising:
dispersing the reinforcing fibers from the fiber-containing particles of the bulk product of any one of paragraphs 13-25 in a matrix, preferably a polymeric matrix, and optionally a resulting composite comprises from 5 weight percent to 50 weight percent of the reinforcing fibers, and with one preferred range being from 10 weight percent to 40 weight percent of the reinforcing fibers.

27. The method of paragraph 26, wherein the matrix is a polymeric matrix comprising a thermoplastic polymer.

28. The method of paragraph 27, wherein the thermoplastic polymer includes a member selected from the group consisting of polyamide, polypropylene, polyethylene, polyethylene terephthalate, polylactic acid, polycarbonate, acrylonitrile butadiene styrene, polystyrene and polyaryle ether ketones.

29. The method of either one of paragraph 27 or paragraph 28, wherein the dispersing comprises extruding polymeric material for the matrix and adding the fiber-containing particles of the bulk product to the polymeric material during the extruding.

30. The method of paragraph 29, comprising pelletizing an extrudate from the extruding, wherein the extrudate comprises the reinforcing fibers dispersed in the matrix, to prepare pellets comprising the reinforcing fibers dispersed in the matrix, and optionally the pellets have a maximum cross dimension (e.g., length dimension) in a range of from 1 millimeters to 25 millimeters, preferably from 4 millimeters to 18 millimeters, and further optionally the pellets have a width dimension, transverse to the maximum cross in a range of from 1 millimeters to 6 millimeters, and preferably in a range of from 2 to 4 millimeters, and preferably the pellets are cylindrically shaped and with a cylinder length and cylinder diameter within the ranges, and preferably within the preferred ranges, for the maximum cross dimension and the width dimension, respectively.

31. The method of paragraph 30, comprising cooling the extrudate prior to the pelletizing.

32. The method of either one of paragraph 30 or paragraph 31, comprising mixing the pellets with at least one other particulate component that is different than the pellets, and optionally such another particular component comprises second pellets of different composition, and further optionally such second pellets comprise second reinforcing fibers, which may the same as or different than the reinforcing fibers of the pellets, dispersed in second matrix, preferably a second polymeric matrix, which may be the same or different than the matrix of the pellets, and wherein such second reinforcing fibers are optionally uniform fiber lengths cut from continuous fibers.

33. The method of any one of paragraphs 30-32, comprising molding material of the pellets into a product form.

34. The method of paragraph 33, wherein the molding comprises injection molding.

35. The bulk product or method of any one of paragraphs 13-34, wherein the bulk product has a freely settled (untapped) bulk density in a range with a lower limit selected from the group consisting of 100, 200 or 250 grams per liter and an upper limit selected from the group consisting of 400 grams per liter and 350 grams per liter. One preferred range for the untapped bulk density is in a range of from 200 to 300 grams per liter.

36. The bulk product or method of any one of paragraphs 13-35, wherein the bulk product has a tapped bulk density in a range having a lower limit selected from the group consisting of 200, 250 and 300 grams per liter and an upper limit selected from the group consisting of 650 or 600 grams per liter, and optionally the tapped bulk density is in a range of from 1.2 to 2 times as large as the untapped bulk density. One preferred range for the tapped bulk density is in a range of from 250 to 400 grams per liter.

37. The bulk product or method of any one of paragraphs 13-36, wherein the bulk product comprises at least 50 weight percent, preferably at least 70 weight percent, more preferably at least 90 weight percent, even more preferably at least 95 weight percent and still more preferably at least 98 weight percent of the fiber-containing particles. The bulk product may optionally consist of or consist essentially of only the fiber-containing particles.

38. The bulk product or method of any one of paragraphs 13-37, wherein the bulk product has an angle of repose in a range having a lower limit of 25° and an upper limit of 45°, with one more preferred range for the angle of repose being in a range of from 30° to 40°.

39. The particle, bulk product or method of any one of paragraphs 1-38, wherein the reinforcing fibers in each said fiber-containing particle have a weight average fiber length that is smaller than the particle length dimension, preferably no larger than 75 percent of the particle length dimension and often no larger than 60 percent of the particle length dimension.

40. The particle, bulk product or method of paragraph 39, wherein the weight average fiber length is not smaller than 20 percent, preferably not smaller than 25 percent and often not smaller than 30 percent of the particle length dimension.

41. The particle, bulk product or method of either one or paragraph 39 or paragraph 40, wherein the weight average fiber length is at least as large as an amount selected from the group consisting of 1 millimeter, 2 millimeters, 3 millimeters and 4 millimeters.

42. The particle, bulk product or method of any one of paragraphs 39-41, wherein the weight average fiber length is not larger than an amount selected from the group consisting of 18 millimeters, 12 millimeters, 8 millimeters and 6 millimeters. One preferred range for the weight average fiber length is from 3 millimeters to 8 millimeters, with another preferred range being from 4 millimeters to 6 millimeters.

43. The particle, bulk product or method of any one of paragraphs 39-42, wherein at least 70 weight percent, preferably at least 75 weight percent, more preferably at least 80 weight percent and even more preferably at least 85 weight percent, of the reinforcing fibers in the fiber-containing particles have a fiber length in a range of from 0.5 times to 2 times the weight average fiber length.

44. The particle, bulk product or method of any one of paragraphs 39-43, wherein at least 10 weight percent of the fibers have a fiber length outside of a range of from 0.7 to 1.5 times the weight average fiber length.

45. The particle, bulk product or method of any one of paragraphs 39-44, wherein at least 5 weight percent of the reinforcing fibers have a fiber length outside of a range of from 0.5 times to 2 times the weight average fiber length.

46. The particle, bulk product or method of any one of paragraphs 39-45, wherein at least 15 weight percent of the reinforcing fibers have a fiber length outside of a range of from 0.8 times to 1.3 times the weight average fiber length.

47. The particle, bulk product or method of any one of paragraphs 1-46, wherein the reinforcing fibers have a weight average aspect ratio of fiber length to fiber width of at least 100, preferably at least 500 and more preferably at least 1000.

48. The particle, bulk product or method of any one of paragraphs 1-47, wherein the reinforcing fibers have a weight average aspect ratio of fiber length to fiber width of not larger than 49. A method of making fiber-containing particles with reinforcing fibers held in a particle structure by a binder, the method comprising:

processing a fiber feed and a binder material to prepare fiber-containing particles including fibers from the fiber feed, wherein the fiber feed comprises reinforcing fibers in a non-continuous form and the processing comprises:

rotational tumbling of a mixture of the reinforcing fibers and the binder material to form agglomerates each comprising a portion of the reinforcing fibers and a portion of the binder material:

and optionally the method is for making a bulk product comprising fiber-containing particles, and preferably to prepare a bulk product of any one of paragraphs 13-48.

50. The method of paragraph 49, wherein the processing the mixture comprises disposing the reinforcing fibers and the binder material in a process vessel (e.g., rotary drum) and the rotational tumbling comprises rotating the process vessel containing the reinforcing fibers and the binder material.

51. The method of paragraph 50, wherein the rotational tumbling comprises rotating the process vessel with a tangential speed (tip speed) at the inside surface of the rotating wall of the process vessel in a range of from 0.3 to 1.4 meters per second.

52. The method of any one of paragraphs 49-51, wherein the rotational tumbling is performed for a period of time in a range of from 15 minutes to 240 minutes. One more preferred range for the period of time is from 120 minutes to 150 minutes.

53. The method of any one of paragraphs 49-52, wherein feed of the binder material to the processing comprises a binder precursor composition including the binder material dispersed in a carrier liquid.

54. The method of paragraph 53, wherein the binder precursor composition includes at least a portion of the binder material in solids dispersed in the carrier liquid.

55. The method of either one of paragraph 53 or paragraph 54, wherein the processing comprises combining all or a portion of the binder precursor composition with the reinforcing fibers prior to the rotational tumbling (e.g., premixing binder material and reinforcing fibers prior to introduction into the process vessel).

56. The method of any one of paragraphs 53-55, wherein the processing comprises introducing some or all of the binder precursor composition into a process vessel (e.g., rotating drum), optionally while the process vessel is rotating, after the reinforcing fibers are introduced into the process vessel, and optionally the binder precursor composition is sprayed into the process vessel to contact and mix with the reinforcing fibers.

57. The method of any one of paragraphs 53-56, wherein the processing comprises evaporating at least a portion of the carrier liquid after contacting the binder precursor composition with the reinforcing fibers, optionally during and/or after the rotational tumbling, and preferably with at least some, and more preferably a majority, of the evaporating occurring after the rotation tumbling.

58. The method of any one of paragraph 57, wherein the evaporating comprises heating the reinforcing fibers and the carrier liquid, optionally to a temperature of at least 100° C., and further optionally within a range of from 100° C. to 200° C. not inclusive of any post-drying heat cure that may be used for some binding systems such as thermoset binder compositions or very high temperature thermoplastic binder compositions. When the method includes curing the binder material, dried agglomerates may be subjected to higher temperatures for the curing than used to dry the agglomerates, for example curing temperatures may exceed 200° C. and may often be in a range of from 200° C. to 380° C. As discussed above, drying and curing may be performed in a single operation (e.g., in a single oven) with the drying occurring during a first stage of heating to within a lower elevated temperature range to remove water by evaporation and the curing may follow in a second stage of heating to within a higher elevated temperature for the curing. Alternatively, drying and curing may be performed as separate operations, (e.g., in separate ovens).

59. The method of any one of paragraphs 53-58, wherein the carrier liquid is an aqueous liquid.

60. The method of any one of paragraphs 49-59, wherein the processing comprises combining the binder material, the reinforcing fibers and water prior to completion of the rotational tumbling, and wherein the water is at concentration, relative to the total weight of the binder material, the reinforcing fibers and the water, in a range having a lower limit of 10 weight percent and more preferably 20 weight percent and an upper limit of 50 weight percent and more preferably 30 weight percent.

61. The method of any one of paragraphs 49-60, wherein the binder material is in an amount of from 0.5 weight percent to 11 weight percent relative to the weight of the reinforcing fibers.

62. The method of any one of paragraphs 49-61, wherein the binder material is in an amount, relative to the weight of the reinforcing fibers, in a range having a lower limit selected from the group consisting of 0.5 weight percent, 1 weight percent, 2 weight percent, 2.5 weight percent and 3 weight percent and an upper limit selected from the group consisting of 11 weight percent, 9 weight percent, 7 weight percent, 6 weight percent and 5 weight percent. One preferred range is from 2 weight percent to 6 weight percent of the binder material relative to the weight of the reinforcing fibers, and another preferred range is from 2.5 weight percent to 5 weight percent of the binder material relative to the weight of the reinforcing fibers.

63. The method of any one of paragraphs 49-62, wherein the binder material comprises a material selected from the group consisting of polyether polyurethane resin (uncured), polyester polyurethane resin (uncured), maleated polypropylene, polyaryletherketone (PAEK), or epoxy resin (uncured).

64. The method of any one of paragraphs 49-62, comprising drying the agglomerates to prepare dried agglomerates, preferably with the dried agglomerates comprising not more than 0.5 weight percent water, preferably not more than 0.3 weight percent water and more preferably not more than 0.2 weight percent water.

65. The method of any one of paragraphs 49-64, wherein the rotational tumbling comprises aligning the reinforcing fibers, and wherein the rotational tumbling is performed for a time to align the reinforcing fibers in the agglomerates to an alignment configuration in which at least 70 weight percent, preferably at least 80 weight percent and more preferably at least 85 weight percent, of the reinforcing fibers extend longitudinally within an angle of 20° of a longitudinal direction of the agglomerates, preferably within an angle of 15° and more preferably within an angle of 10° of the longitudinal direction.

66. The method of paragraph 65, comprising after attaining the alignment configuration, drying the agglomerates to remove liquid from the agglomerate particles.

67. The method of any one of paragraphs 49-66, comprising providing the fiber feed, wherein the providing the fiber feed comprises processing a preliminary fiber feed wherein the processing a preliminary fiber feed comprises cutting preliminary forms of the reinforcing fibers to prepare cut fibers and preparing the fiber feed to include at least a portion of the cut fibers.

68. The method of either one of paragraph 67, wherein the providing the fiber feed comprises preparing the preliminary fiber feed with recycled reinforcing fibers, the preparing the preliminary fiber feed comprising recovering the recycled reinforcing fibers from a composite material wherein the recovering the recycled reinforcing fibers comprises freeing the recycled reinforcing fibers from a matrix of the composite, optionally comprising solvation of the matrix of the composite, optionally comprising pyrolysis of the matrix of the composite and optionally comprising depolymerization of the matrix of the composite.

69. The method of any one of paragraphs 49-68, wherein a weight average fiber length of the reinforcing fibers in the fiber feed is at least as large as an amount selected from the group consisting of 1 millimeter, 2 millimeters, 3 millimeters and 4 millimeters.

70. The particle, bulk product or method of any one of paragraphs 49-69, wherein a weight average fiber length of the reinforcing fibers in the fiber feed is not larger than an amount selected from the group consisting of 18 millimeters, 12 millimeters, 8 millimeters and 6 millimeters. One preferred range for the weight average fiber length in the fiber feed is from 3 millimeters to 8 millimeters, with another preferred range being from 4 millimeters to 6 millimeters.

71. The method of any one of any one of paragraphs 49-70, comprising classifying agglomerates to remove some of the agglomerates having a property value larger than a property criterion and not including the removed agglomerates in the bulk product comprising the fiber-containing particles.

72. The method of paragraph 71, wherein the property criterion is a maximum agglomerate length between longitudinal ends of the agglomerate, for example to remove agglomerates having a maximum agglomerate length longer than a desired maximum agglomerate length.

73. The method of any one of paragraphs 49-72, wherein the reinforcing fibers of the fiber feed are in the absence of fiber sizing.

74. The method of any one of paragraphs 49-73, wherein the reinforcing fibers comprise fiber sizing, optionally with the fiber sizing in an amount in a range of from 0.5 weight percent to 10 weight percent of the reinforcing fibers, including the weight of the fiber sizing.

75. The method of any one of paragraphs 49-74, comprising processing the agglomerates to prepare a bulk product according to any one of paragraphs 13-25 and 35-48.

76. The bulk product prepared according to the method of paragraph 75.

77. A bulk product comprising, optionally consisting essentially of and further optionally consisting of, particles selected from the group consisting of the agglomerates prepared according to the method of any one of paragraphs 49-74, modified particles prepared from the agglomerates (e.g., dried and/or cured agglomerates) and combinations thereof.

78. The bulk product of paragraph 77, consisting essentially of, and optionally consisting of, the agglomerates following drying (e.g. dried agglomerates).

79. The fiber-containing particle, bulk product or method of any one of paragraphs 1-78, wherein the reinforcing fibers are carbon fibers, and optionally the carbon fibers have a width (e.g., diameter) in a range of from 5 microns to 10 microns, and preferably from 5 microns to 7 microns.

80. The fiber-containing particle, bulk product or method of any one of paragraphs 1-79, wherein the reinforcing fibers are selected from the group consisting of glass fibers, mineral fibers, natural fibers, carbon nanotubes, polymeric fibers (e.g., aramid, polyamide or polyolefin fibers), metallic fibers and combinations thereof. Some possible polyolefin fibers include fibers of polypropylene, polyethylene, and propylene-ethylene copolymers, and including high performance polyolefin fibers, for example Dyneema® fibers (ultra-high molecular weight polyethylene) or Innegra fibers (high modulus polypropylene). Some possible mineral fibers include fibers of basalt, mineral wool or quartz. Some possible natural fibers include fibers of bamboo, flax, hemp, jute or kenaf. Some example metallic fibers include fibers of metal, metal alloys or intermetallics, with some more specific examples being fibers of steel or bronze.

81. The fiber-containing particle, bulk product or method of any one of paragraphs 1-80, wherein the reinforcing fibers have a weight average fiber width (e.g., diameter) in a range of from 0.5 microns to 100 microns.

82. The fiber-containing particle, bulk product or method of any one of paragraphs 1-81, wherein the reinforcing fibers comprise recycled fibers.

The terms "comprising", "containing", "including" and "having", and grammatical variations of those terms, are intended to be inclusive and nonlimiting in that the use of such terms indicates the presence of a stated condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or any appropriate grammatical variation of such narrower terms). For example, a statement that something "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all. The term "at least a majority" means all or a majority part that is less than all. Weight-base averages for properties of items (e.g., fibers, fiber-containing particles, or bulk products) as used herein are equivalent to mass-based averages of the properties of the items, and as will be appreciated will typically be different than number-based averages of the properties of the items (for example as a consequence of differences in mass content between individual items) and volumetric-based averages (for example as a consequence of variations in densities between individual items).

What is claimed is:

1. A method of making a bulk product comprising a plurality of fiber-containing particles, the method comprising:
    processing a fiber feed and a binder material to prepare fiber-containing particles including fibers from the fiber feed, wherein the fiber feed comprises reinforcing fibers in a non-continuous form and the processing comprises:
    disposing the reinforcing fibers from the fiber feed and the binder material in a process vessel;
    rotational tumbling of a mixture of the reinforcing fibers from the fiber feed and the binder material to form agglomerates each comprising a portion of the reinforcing fibers from the fiber feed and a portion of the binder material, the rotational tumbling comprising rotating the process vessel containing the reinforcing fibers from the fiber feed and the binder material;
    during the rotational tumbling, forming the agglomerates comprising a plurality of dual-tapered agglomerates having a dual-tapered particle structure, wherein the dual-tapered particle structure comprises:
        a particle length dimension, being a maximum separation distance in a longitudinal direction between first and second longitudinal ends of the agglomerate;
        a maximum particle width dimension transverse to the longitudinal direction at a longitudinal location between the first and second longitudinal ends;
        an aspect ratio equal to the particle length dimension divided by the maximum particle width dimension; and
        a dual-tapered shape comprising a first tapered portion tapering in the longitudinal direction away from the longitudinal location toward the first longitudinal end and a second tapered portion tapering in the longitudinal direction away from the longitudinal location toward the second longitudinal end; and
    recovering the agglomerates including the dual-tapered agglomerates prepared during the rotational tumbling; and
    wherein the mixture comprises the binder material in an amount of from 0.5 weight percent to 11 weight percent relative to the weight of the reinforcing fibers from the fiber feed in the mixture.

2. The method of claim 1, wherein:
    the rotational tumbling comprises rotating the process vessel with a tangential speed at the inside surface of the rotating wall of the process vessel in a range of from 0.3 to 1.4 meters per second; and
    the rotational tumbling is performed for a period of time in a range of from 15 minutes to 240 minutes.

3. The method of claim 1, wherein feed of the binder material to the processing comprises a binder precursor composition including the binder material dispersed in a carrier liquid.

4. The method of claim 3, wherein the processing comprises combining all or a portion of the binder precursor composition with the reinforcing fibers from the fiber feed prior to the rotational tumbling.

5. The method of claim 3, wherein the processing comprises introducing some or all of the binder precursor composition into the process vessel after the reinforcing fibers from the fiber feed are introduced into the process vessel while the process vessel is rotating.

6. The method of claim 3, wherein the processing comprises evaporating at least a portion of the carrier liquid after contacting the binder precursor composition with the reinforcing fibers from the fiber feed and during a time period selected from the group consisting of during the rotational tumbling, after the rotational tumbling and combinations thereof.

7. The method of claim 6, wherein the evaporating comprises heating the reinforcing fibers from the fiber feed and the carrier liquid to a temperature of at least 100° C.

8. The method of claim 7, wherein the carrier liquid is an aqueous liquid.

9. The method of claim 8, wherein the processing comprises combining the binder material, the reinforcing fibers from the fiber feed and water prior to completion of the rotational tumbling, and wherein the water is at a concentration, relative to the total weight of the binder material, the reinforcing fibers from the fiber feed and the water, in a range of from 10 weight percent to 50 weight percent.

10. The method of claim 9, comprising drying the agglomerates to prepare dried agglomerates having not more than 0.5 weight percent water.

11. The method of claim 1, comprising:
during the rotational tumbling, forming the agglomerates with at least 25 weight percent of the agglomerates being the dual-tapered agglomerates.

12. The method of claim 1, comprising providing the fiber feed, wherein the providing the fiber feed comprises processing a preliminary fiber feed wherein the processing a preliminary fiber feed comprises cutting preliminary forms of reinforcing fibers to prepare cut fibers and preparing the fiber feed to include at least a portion of the cut fibers as the reinforcing fibers in the fiber feed.

13. The method of claim 12, wherein the providing the fiber feed comprises preparing the preliminary fiber feed with recycled reinforcing fibers, the preparing the preliminary fiber feed comprising recovering the recycled reinforcing fibers from a composite material wherein the recovering the recycled reinforcing fibers comprises freeing the recycled reinforcing fibers from a matrix of the composite.

14. The method of claim 1, wherein a weight average fiber length of the reinforcing fibers in the fiber feed is in a range of from 1 millimeter to 18 millimeters.

15. The method of claim 1, comprising classifying agglomerates to remove some of the agglomerates having a length larger than a maximum particle length criterion.

16. The method of claim 1, wherein the dual-tapered agglomerates comprise:
a weight average particle length dimension in a range of from 3 millimeters to 40 millimeters, wherein the weight average particle length dimension is an average on a weight basis of the particle length dimensions of the dual-tapered agglomerates; and
a weight average aspect ratio of at least 1.5, wherein the weight average aspect ratio is an average on a weight basis of the aspect ratios of the dual-tapered agglomerates.

17. The method of claim 16, wherein the weight average particle length dimension of the dual-tapered agglomerates is in a range of 2 times to 3 times a weight average fiber length of the reinforcing fibers in the fiber feed.

18. The method of claim 1, wherein:
the amount of the binder material is from 1 weight percent to 5 weight percent relative to the weight of the reinforcing fibers;
a weight average fiber length of the reinforcing fibers in the fiber feed is in a range of from 3 millimeters to 8 millimeters; and
a weight average particle length dimension is in a range of from 5 millimeters to 16 millimeters, wherein the weight average particle length dimension is an average on a weight basis of the particle length dimensions of the fiber-containing particles.

19. The method of claim 18, wherein
the first tapered portion tapers over a longitudinal distance of at least 20 percent of the particle length dimension within a tapering envelope of a right circular cone with an apex at the first longitudinal end and an aperture in a range of from 10° to 40°; and
the second tapered portion tapers over a longitudinal distance of at least 20 percent of the particle length dimension within a tapering envelope of a right circular cone with an apex at the second longitudinal end and an aperture in a range of from 10° to 40°.

20. The method of claim 18, wherein the reinforcing fibers in the fiber feed comprise carbon fibers.

21. The method of claim 20, wherein the processing comprises:
combining the binder material, the reinforcing fibers and water prior to completion of the rotational tumbling, and wherein the water is at a concentration, relative to the total weight of the binder material, the reinforcing fibers and the water, in a range of from 20 weight percent to 30 weight percent; and
drying the dual-tapered agglomerates to a dried form comprising no more than 0.3 weight percent water.

22. The method of claim 12, wherein:
the preliminary fiber feed comprises recycled carbon fibers in non-continuous form recovered from composite material in which the recycled carbon fibers were held by polymeric matrix;
the reinforcing fibers of the fiber feed comprise carbon fibers resulting from subjecting the recycled carbon fibers to the cutting; and
the recycled carbon fibers of the preliminary fiber feed comprise a degree of randomness in longitudinal alignment; and
the rotational tumbling comprises increasing longitudinal alignment of the reinforcing fibers from the fiber feed relative to the preliminary fiber feed and preparing the dual-tapered particles with the longitudinal alignment of the reinforcing fibers from the fiber feed in the dual-tapered particles comprising a lower degree of randomness than in the preliminary fiber feed.

23. The method of claim 22, wherein the fiber-containing particles comprise:
from 1 weight percent to 5 weight percent binder;
from 93 weight percent to 98 weight percent of the reinforcing fibers from the fiber feed;
no more than 0.3 weight percent water;
a weight average aspect ratio in a range of from 1.8 to 4, wherein the weight average aspect ratio is an average on a weight basis of the aspect ratios of the fiber-containing particles; and
a weight average particle length dimension in a range of from 5 millimeters to 16 millimeters, wherein the weight average particle length dimension is an average on a weight basis of the particle length dimensions of the fiber-containing particles.

24. The method of claim 23, wherein each said fiber-containing particle comprises:
the first tapered portion tapering over a longitudinal distance of at least 20 percent of the particle length dimension of the fiber-containing particle within a tapering envelope of a right circular cone with an apex at the first longitudinal end of the fiber-containing particle and an aperture in a range of from 10° to 40°; and
the second tapered portion tapering over a longitudinal distance of at least 20 percent of the particle length dimension of the fiber-containing particle within a tapering envelope of a right circular cone with an apex at the second t longitudinal end of the fiber-containing particle and an aperture in a range of from 10° to 40°.

25. A method of making a bulk product comprising a plurality of fiber-containing particles, the method comprising:
processing a fiber feed and a binder material to prepare fiber-containing particles including fibers from the fiber feed, wherein the fiber feed comprises reinforcing fibers in a non-continuous form having a weight average fiber length of the reinforcing fibers in the fiber feed in a range of from 1 millimeter to 18 millimeters;
the processing comprising rotational tumbling of a mixture of the reinforcing fibers from the fiber feed and the binder material to form agglomerates each comprising a portion of the reinforcing fibers from the fiber feed and a portion of the binder material;
during the rotational tumbling, forming the agglomerates with at least 25 weight percent of the agglomerates being dual-tapered agglomerates having a dual-tapered particle structure, wherein the dual-tapered particle structure comprises;
a particle length dimension, being a maximum separation distance in a longitudinal direction between first and second longitudinal ends of the agglomerate;
a maximum particle width dimension transverse to the longitudinal direction at a longitudinal location between the first and second longitudinal ends;
an aspect ratio equal to the particle length dimension divided by the maximum particle width dimension; and
a dual-tapered shape comprising a first tapered portion tapering in the longitudinal direction away from the longitudinal location toward the first longitudinal end and a second tapered portion tapering in the longitudinal direction away from the longitudinal location toward the second longitudinal end; and
recovering the agglomerates including the dual-tapered agglomerates prepared during the rotational tumbling;
wherein the dual-tapered agglomerates comprise:
from 90 weight percent to 99.5 weight percent reinforcing fibers from the fiber feed; and
from 0.5 weight percent to 10 weight percent of the binder material;
a weight average particle length dimension in a range of from 3 millimeters to 40 millimeters, wherein the weight average particle length dimension is an average on a weight basis of the particle length dimensions of the dual-tapered agglomerates; and
a weight average aspect ratio of at least 1.5, wherein the weight average aspect ratio is an average on a weight basis of the aspect ratios of the dual-tapered agglomerates.

26. A method of making a bulk product comprising a plurality of fiber-containing particles, the method comprising:
processing a fiber feed and a binder material to prepare fiber-containing particles including fibers from the fiber feed, wherein the fiber feed comprises reinforcing fibers in a non-continuous form;
the processing comprising rotational tumbling of a mixture of the reinforcing fibers from the fiber feed and the binder material to form agglomerates each comprising a portion of the reinforcing fibers from the fiber feed and a portion of the binder material;
during the rotational tumbling, forming the agglomerates with at least 25 weight percent of the agglomerates being dual-tapered agglomerates having a dual-tapered particle structure; wherein the dual-tapered particle structure comprises:
a particle length dimension, being a maximum separation distance in a longitudinal direction between first and second longitudinal ends of the agglomerate;
a maximum particle width dimension transverse to the longitudinal direction at a longitudinal location between the first and second longitudinal ends;
an aspect ratio equal to the particle length dimension divided by the maximum particle width dimension; and
a dual-tapered shape comprising a first tapered portion tapering in the longitudinal direction away from the longitudinal location toward the first longitudinal end and a second tapered portion tapering in the longitudinal direction away from the longitudinal location toward the second longitudinal end;
recovering the agglomerates including the dual-tapered agglomerates prepared during the rotational tumbling;
preparing a fiber-containing bulk product comprising a plurality of the fiber-containing particles, the plurality of the fiber-containing particles comprising:
from 90 weight percent to 99.5 weight percent of the reinforcing fibers from the fiber feed;
from 0.5 weight percent to 10 weight percent binder, holding the reinforcing fibers in a particle structure;
each said fiber-containing particle of the plurality of the fiber-containing particles comprising:
a particle length dimension, being a maximum separation distance in a longitudinal direction between first and second longitudinal ends of the particle;
a maximum particle width dimension transverse to the longitudinal direction at a longitudinal location between the first and second longitudinal ends;
an aspect ratio equal to the particle length dimension divided by the maximum particle width dimension; and
a dual-tapered shape comprising a first tapered portion tapering in the longitudinal direction away from the longitudinal location toward the first longitudinal end and a second tapered portion tapering in the longitudinal direction away from the longitudinal location toward the second longitudinal end; and
the plurality of the fiber-containing particles further comprising:
a weight average particle length dimension of the fiber-containing particles is in a range of from 3 millimeters to 40 millimeters, wherein the weight average particle length dimension is an average on a weight basis of the particle length dimensions of the fiber-containing particles; and
a weight average aspect ratio of the fiber-containing particles of at least 1.5, wherein the weight average aspect ratio is an average on a weight basis of the aspect ratios of the fiber-containing particles;
wherein the plurality of the fiber-containing particles comprise at least one member selected from the group consisting of the dual-tapered agglomerates and modified dual-tapered particles resulting from subsequent processing of the dual-tapered agglomerates after the rotational tumbling.

27. The method of claim 26, wherein the plurality of the fiber-containing particles comprise the dual-tapered agglomerates.

28. The method of claim 26, wherein the method comprises the subsequent processing and the plurality of the fiber-containing particles comprise the modified dual-tapered particles.

29. The method of claim 28, wherein the subsequent processing comprises drying at a temperature of at least 100° C. to remove water, and the fiber-containing particles after the drying comprise not more than 0.5 weight percent water.

30. The method of claim 28 wherein the subsequent processing comprises size classification to remove particles having a particle length larger than a maximum length criterion, and the modified dual-tapered particles have a smaller weight average particle length than the dual-tapered agglomerates.

31. The method of claim 26, wherein the particle length dimensions of at least 75 weight percent of the plurality of the fiber-containing particles are in a range of from 0.5 times the weight average particle length dimension to 2 times the weight average particle length dimension.

32. The method of claim 31, wherein the particle length dimensions of at least 2 weight percent of the plurality of the fiber-containing particles are outside of a range of from 0.8 times the weight average particle length dimension to 1.2 times the weight average particle dimension.

33. The method of claim 32, wherein the particle length dimensions of at least 98 weight percent of the plurality of the fiber-containing particles are no larger than 3 times the weight average particle length dimension.

34. The method of claim 33, wherein the reinforcing fibers in each said fiber-containing particle of the plurality of the fiber-containing particles have a weight average fiber length in a range of from 20 percent of the particle length dimension to 75 percent of the particle length dimension.

35. The method of claim 33, wherein a weight average fiber length in each said fiber-containing particle of the plurality of the fiber-containing particles is in a range of from 1 millimeter to 18 millimeters.

36. The method of claim 35, wherein the rotational tumbling comprises aligning the reinforcing fibers in the dual-tapered agglomerates to an extent of at least 70 weight percent of the reinforcing fibers in the agglomerates extending longitudinally within an angle of 20° of the longitudinal direction.

37. The method of claim 26, wherein the plurality of the fiber-containing particles comprise at least 25 weight percent of the bulk product.

38. The method of claim 26, comprising during the rotational tumbling, preparing the agglomerates with at least 50 weight percent of the dual-tapered agglomerates; and
wherein the plurality of the fiber-containing particles comprise at least 50 weight percent of the bulk product.

39. A method for making a fiber-reinforced composite, the method comprising:
making a fiber-containing bulk product by the method of claim 26; and
dispersing the reinforcing fibers from the plurality of the fiber-containing particles of the fiber-containing bulk product in a polymeric matrix.

40. The method of claim 39, wherein the dispersing comprises extruding polymeric material for the matrix and adding the plurality of the fiber-containing particles of the fiber-containing bulk product to the polymeric material during the extruding; and the method further comprising:
pelletizing an extrudate from the extruding, wherein the extrudate comprises the reinforcing fibers dispersed in the matrix, to prepare pellets comprising the reinforcing fibers from the plurality of the fiber-containing particles dispersed in the matrix.

41. The method of claim 40, comprising injection molding material of the pellets into a product form.

* * * * *